(12) United States Patent
Yang et al.

(10) Patent No.: US 9,342,915 B2
(45) Date of Patent: May 17, 2016

(54) THREE DIMENSIONAL IMAGE DISPLAY METHOD

(71) Applicant: Hisense Hiview Tech Co., Ltd., Shandong (CN)

(72) Inventors: Jie Yang, Shandong (CN); Aichen Xu, Shandong (CN); Shunming Huang, Shandong (CN)

(73) Assignee: Hisense Hiview Tech Co., Ltd. (CN)

( * ) Notice: Subject to any disclaimer, the term of this patent is extended or adjusted under 35 U.S.C. 154(b) by 342 days.

(21) Appl. No.: 13/943,889

(22) Filed: Jul. 17, 2013

(65) Prior Publication Data

US 2014/0028664 A1    Jan. 30, 2014

(30) Foreign Application Priority Data

Jul. 26, 2012  (CN) .......................... 2012 1 0261867

(51) Int. Cl.
  *G06T 15/00*   (2011.01)
  *H04N 13/04*   (2006.01)
(52) U.S. Cl.
  CPC ............ *G06T 15/00* (2013.01); *H04N 13/0438* (2013.01); *H04N 13/0497* (2013.01); *H04N 2213/008* (2013.01)

(58) Field of Classification Search
None
See application file for complete search history.

(56) References Cited

U.S. PATENT DOCUMENTS

2010/0026794 A1*   2/2010   Chang ............................. 348/56

* cited by examiner

*Primary Examiner* — Mark Zimmerman
*Assistant Examiner* — Vu Nguyen
(74) *Attorney, Agent, or Firm* — DLA Piper LLP (US)

(57) ABSTRACT

The present application provides an image display method and device. A frame of 3D image including a left eye image and a right eye image is received, two fields of compensation images are inserted between the left eye image display and the right eye image display, so that the superposed effect of displaying four fields of images of the frame of 3D image is the left eye image or the right eye image, to achieve a 2D image, furthermore, the left spectacle lens of the 3D glasses is opened when the left eye image is displayed, the right spectacle lens of the 3D glasses is opened when the right eye image is displayed, and both the left spectacle lens and the right spectacle lens are closed when the compensation images are displayed, to achieve the 3D image display.

16 Claims, 10 Drawing Sheets

THREE DIMENSIONAL IMAGE DISPLAY METHOD

The present application claims priority to Chinese Patent Application No. 201210261867.3, filed with the State Intellectual Property Office of China on Jul. 26, 2012 and entitled "IMAGE DISPLAY METHOD AND DEVICE", which is hereby incorporated by reference in its entirety.

FIELD OF THE INVENTION

The present invention relates to the technical field of display, and in particular to an image display method and device.

BACKGROUND OF THE INVENTION

With the development of 3D display technologies, people can enjoy 3D high-definition video at home. In the prior art, the 3D display technologies can be implemented by multiple technical solutions, mainly including a shutter 3D display method and a polarized 3D display method.

Herein, the implementation principle of the shutter 3D display method is as shown in FIG. 1, please see FIG. 1. In the shutter 3D display method, left and right eye images are alternately displayed, to be specific, namely when the right eye image is required to be displayed, right spectacle lens is opened and left spectacle lens is closed; when the left eye image is required to be displayed, the left spectacle lens is opened and the right spectacle lens is closed; and in the whole process, the refresh time sequence of the left and right eye images is kept synchronous with the opening and closing time sequence of the left spectacle lens and the right spectacle lens of the glasses, so that the left eye of a person can see the left eye image of each frame of image through the left spectacle lens of the 3D glasses, the right eye of the person can see the right eye image of each frame of image through the right spectacle lens of the 3D glasses, and a 3D image is formed by processing of the brain of the person.

The technical solution that left and right eye images are discretely displayed is adopted in the implementation process of the shutter 3D display method, the resolution of the left eye image is not lost when the left eye image is displayed, and the resolution of the right eye image is not lost when the right eye image is displayed, so compared with other 3D display technologies such as the polarized 3D display method, the shutter 3D display method has the advantage of keeping the original resolution of pictures, can keep high quality of the pictures and can also bring high-quality 3D video enjoyment to people.

However, the inventor finds that the shutter 3D display method at least has the following facts in the process of implementing the technical solutions in the embodiments of the invention.

Because the shutter 3D display method in the prior art alternates left and right eye images in the process of implementing 3D display, namely if the first image is a left eye image of a first frame of image, the second image is a right eye image of the first frame of image, and so on; in such display method, it is obvious that if a user does not wear 3D glasses and directly watches images on the display screen, the left eye image and the right eye image of each frame of image in the 3D display method are the same image under different viewpoints, the left eye image and the right eye image of each frame of image inevitably have visual displacement difference under different viewpoints, and the left and right eye images are superposed on the display screen to form double-image due to the displacement difference, so that the user sees the double-image when directly watching with eyes.

The double-image directly appears on the display screen in the 3D display process of the shutter 3D display method in the prior art, and the user directly watching with eyes sees the double-image, so the shutter 3D display method in the prior art has the fact that simultaneous watching of 3D users and 2D users cannot be met.

SUMMARY OF THE INVENTION

Embodiments of the present application provides an image display method for solving the facts that double-image directly appears on the display screen in the 3D display process of the conventional shutter 3D display method and is seen by users directly watching with eyes.

For achieving the objective of the present application, on one hand, an embodiment of the present invention provides an image display method, applied to electronic equipment including a display screen, and the method includes:

acquiring a frame of 3D image, wherein the frame of 3D image includes left eye image data and right eye image data;

acquiring first compensation image data and second compensation image data;

in a first image display period, displaying a left eye image acquired on the basis of the left eye image data on the display screen, and meanwhile transmitting a first control signal to 3D glasses matched with the electronic equipment and including a left spectacle lens and a right spectacle lens, wherein the 3D glasses can allow the left spectacle lens to be in an open state and allow the right spectacle lens to be in a closed state based on the first control signal;

in a second image display period, displaying a first compensation image acquired on the basis of the first compensation image data on the display screen, wherein in the second image display period, both the left spectacle lens and the right spectacle lens of the 3D glasses are in a closed state;

in a third image display period, displaying a right eye image acquired on the basis of the right eye image data on the display screen, and meanwhile transmitting a second control signal to the 3D glasses, wherein the 3D glasses can allow the right spectacle lens to be in an open state and allow the left spectacle lens to be in a closed state based on the second control signal; and in a fourth image display period, displaying a second compensation image acquired on the basis of the second compensation image data on the display screen, wherein in the fourth image display period, both the left spectacle lens and the right spectacle lens of the 3D glasses are in a closed state;

wherein, a superposed image of the left eye image, the first compensation image, the right eye image and the second compensation image is the left eye image or the right eye image.

Through the technical solutions of one or more embodiments of the invention, at least the following technical effects can be achieved.

Firstly, the first and second compensation images are added, and the superposed image of the left eye image, the right eye image, the first compensation image and the second compensation image is the left eye image or the right eye image, so that the fact that double-image is displayed on the display screen of the electronic equipment in the prior art is solved, and the technical effect of directly displaying the left eye image or the right eye image without double-image on the display screen is achieved.

Secondly, the left eye image or the right eye image without double-image can be directly displayed on the display screen, so that the fact that 3D watchers and 2D watchers cannot watch clear images at the same time in the prior art can be effectively solved, and the technical effect that the 3D watchers and the 2D watchers can watch clear images at the same time is achieved.

Thirdly, for the same watcher, random switching of watching modes can be realized through the technical solutions of the embodiments, namely when the images are not expected to be watched in a 3D mode, the 3D glasses can be taken off, and the left eye image or the right eye image without double-image is directly watched with eyes; and when the images are not expected to be watched in a 2D mode, the 3D glasses can be worn, and the clear 3D images can be watched through the 3D glasses.

DETAILED DESCRIPTION OF THE EMBODIMENTS

Figure 1:
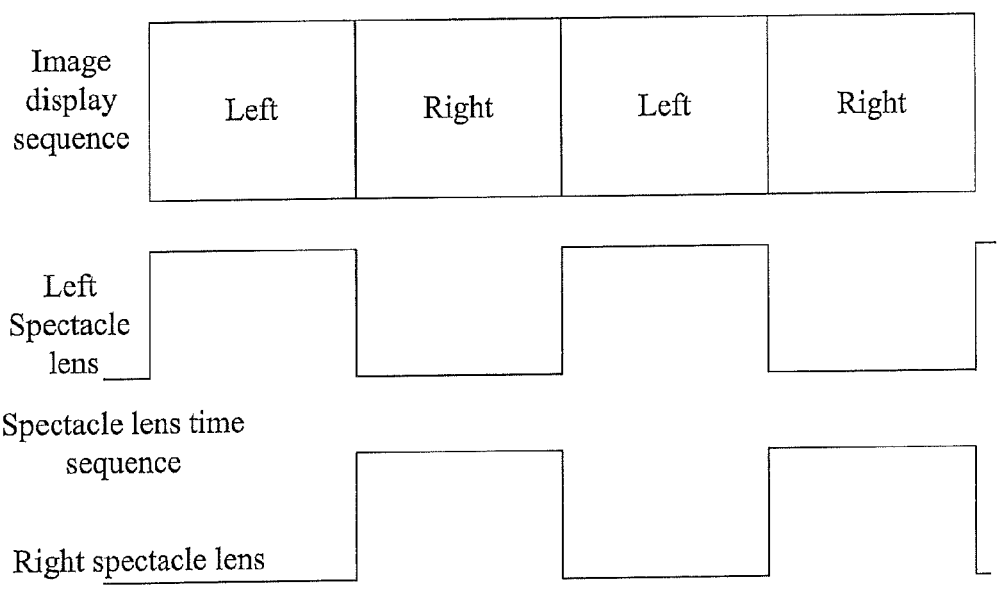
FIG. 1 is a schematic diagram of the shutter 3D display method in the prior art.

Embodiments of the application provide an image display method and an image display device for solving the facts that double-image directly appears on the display screen in the 3D display process of the conventional shutter 3D display method and is seen by users directly watching with eyes.

The general thinking of the technical solutions for solving the facts in the embodiments of the application is as follows.

When an image signal receiving unit receives a frame of 3D image including left eye image data and right eye image data, first compensation image data and second compensation image data are acquired by calculating on the basis of the left eye image data and the right eye image data, and the first compensation image data and the second compensation image data are inserted into the frame of 3D image; in a first image display period, a left eye image is displayed on the display screen, a left spectacle lens of 3D glasses is opened, and a right spectacle lens is closed; in a second image display period, a first compensation image is displayed on the display screen, the left spectacle lens and the right spectacle lens of the 3D glasses are closed; in a third image display period, a right eye image is displayed on the display screen, the right spectacle lens of the 3D glasses is opened, and the left spectacle lens is closed; in a fourth image display period, a second compensation image is displayed, the left spectacle lens and the right spectacle lens of the 3D glasses are closed; when a person watches the images on the display screen through the 3D glasses, the left eye of the person watches the left eye image, the right eye of the person watches the right eye image, and a 3D image is formed in the brain of the person, so that a 3D effect is achieved, wherein, the superposed image of the left eye image, the first compensation image, the right eye image and the second compensation image is the left eye image or the right eye image.

Furthermore, because the superposed image of the left eye image, the first compensation image, the right eye image and the second compensation image is the left eye image or the right eye image, thus, it can be ensured that when a watcher does not wear the 3D glasses, a display image watched through eyes is the superposed image, namely the left eye image or the right eye image; and because the left eye image or the right eye image is a 2D image without double-image, the display image watched by the watcher is a 2D image without double-image.

To provide a more clear understanding of the present application to those skilled in the art, details of the technical solutions in the embodiments of the application are described through implementations in conjunction with the drawings.

First Embodiment

The embodiment provides an image display method. The method is applied to an image display device, and in practice, the image display device can be a television or network video play equipment or the like. In the embodiment of the application, the image display device is illustrated by taking a 1920*1080/120 Hz liquid crystal television as an example.

Figure 9:
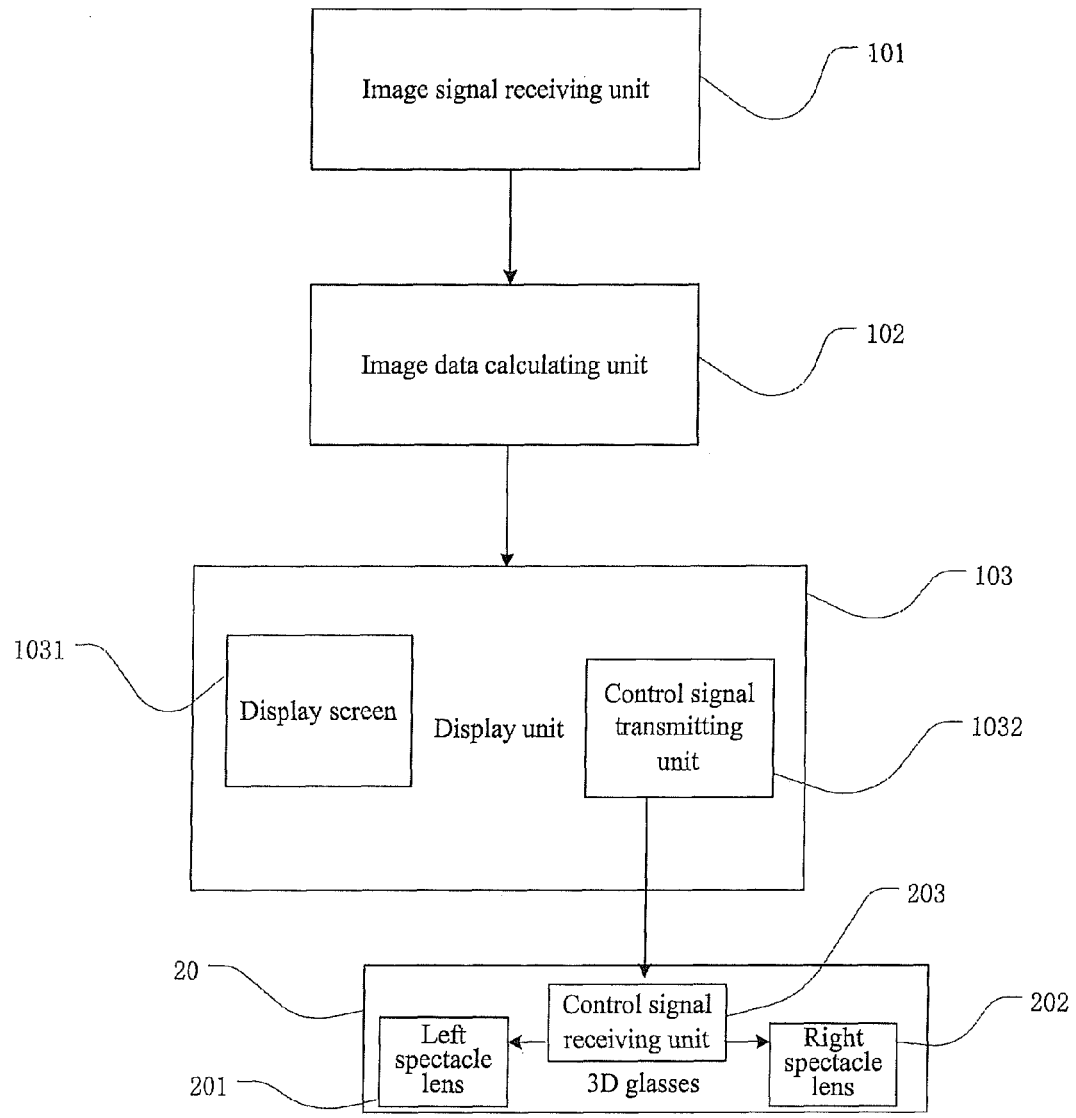
FIG. 9 is a frame diagram of an image display device in a third embodiment of the application.

As shown in FIG. 9, the image display device applying the method in the first embodiment, includes:

an image signal receiving unit 101, configured to receive a frame of 3D image, wherein the frame of 3D image includes left eye image data and right eye image data;

an image data calculating unit 102, connected with the image signal receiving unit 101 and configured to calculate on the basis of the left eye image data and the right eye image data to acquire first compensation image data and second compensation image data;

a display unit 103, capable of being connected with 3D glasses 20 and including a display screen 1031 and a control signal transmitting unit 1032, wherein the 3D glasses 20 include a left spectacle lens 201, a right spectacle lens 202 and a control signal receiving unit 203, wherein, in a first image display period, a left eye image acquired on the basis of the left eye image data is displayed on the display screen 1031, and meanwhile a first control signal is transmitted to the 3D glasses 20 through the control signal transmitting unit 1032, wherein the 3D glasses 20 can receive the first control signal through the control signal receiving unit 203 and allow the left spectacle lens 201 to be in an open state and allow the right spectacle lens 202 to be in a closed state under the control of the first control signal;

in a second image display period, a first compensation image acquired on the basis of the first compensation image data is displayed on the display screen 1031, wherein in the second image display period, both the left spectacle lens 201 and the right spectacle lens 202 of the 3D glasses 20 are in a closed state;

in a third image display period, a right eye image acquired on the basis of the right eye image data is displayed on the display screen 1031, and meanwhile a second control signal is transmitted to the 3D glasses 20 through the control signal transmitting unit 1032, wherein the 3D glasses 20 can receive the second control signal through the control signal receiving unit 203 and allow the right spectacle lens 202 to be in an open state and allow the left spectacle lens 201 to be in a closed state under the control of the second control signal; and in a fourth image display period, a second compensation image acquired on the basis of the second compensation image data is displayed on the display screen 1031, wherein in the fourth image display period, both the left spectacle lens 201 and the right spectacle lens 202 of the 3D glasses 20 are in a closed state;

wherein, a superposed image of the left eye image, the first compensation image, the right eye image and the second compensation image is the left eye image or the right eye image.

Figure 2:
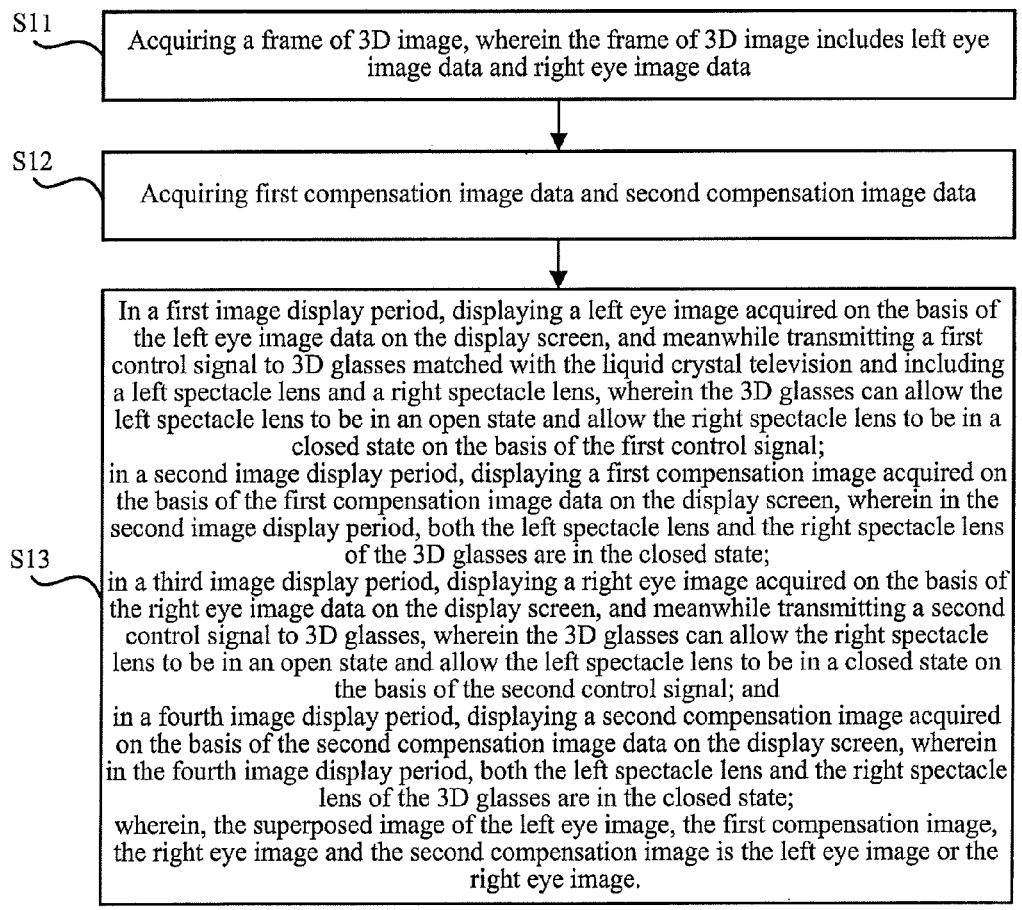
FIG. 2 is a flow chart of an image display method in a first embodiment of the application.

Next, the implementation process of the image display method in the first embodiment of the application is described in detail in an input period $\frac{1}{60}$ s of a frame of 3D image in conjunction with FIG. 2. The method includes the following steps.

Step S11: acquiring a frame of 60 Hz 3D image, wherein the frame of 3D image includes left eye image data and right eye image data;

Step S12: acquiring first compensation image data and second compensation image data;

Step S13: in a first image display period $\frac{1}{240}$ s, displaying a left eye image acquired on the basis of the left eye image data on the display screen 1031, and meanwhile transmitting a first control signal to 3D glasses 20 matched with the liquid crystal television and including the left spectacle lens 201 and the right spectacle lens 202, wherein the 3D glasses 20 can allow the left spectacle lens 201 to be in an open state and allow the right spectacle lens 202 to be in a closed state based on the first control signal;

in a second image display period $\frac{1}{240}$ s, displaying a first compensation image acquired on the basis of the first compensation image data on the display screen 1031, wherein in the second image display period, both the left spectacle lens 201 and the right spectacle lens 202 of the 3D glasses 20 are in the closed state;

in a third image display period $\frac{1}{240}$ s, displaying a right eye image acquired on the basis of the right eye image data on the display screen 1031, and meanwhile transmitting a second control signal to 3D glasses 20, wherein the 3D glasses 20 can allow the right spectacle lens 202 to be in an open state and allow the left spectacle lens 201 to be in a closed state based on the second control signal; and in a fourth image display period $\frac{1}{240}$ s, displaying a second compensation image acquired on the basis of the second compensation image data on the display screen 1031, wherein in the fourth image display period, both the left spectacle lens 201 and the right spectacle lens 202 of the 3D glasses 20 are in the closed state;

wherein, a superposed image of the left eye image, the first compensation image, the right eye image and the second compensation image is the left eye image or the right eye image.

In the embodiment, the 3D image is a set of video image data, the video data is transmitted at a frequency of 60 Hz, and a frame of 60 Hz 3D image is required to be transmitted within 1 second. In the set of video image data of the 3D image includes left eye image data and right eye image data, the left eye image data and the right eye image data are 2 sets of different image data acquired by converting the same scene under a left eye viewing angle and a right eye viewing angle and are coded in a 3D video format and compressed into a frame of 3D image, and the transmission method for the left eye image data and the right eye image data included in such frame of 3D image is beneficial to transmission and 3D resolution of video data.

The left eye image data or the right eye image data is processed in the implementation process of 3D display and displayed as the left eye image or the right eye image on the display screen 1031, the left eye image data is processed and displayed as the left eye image on the display screen 1031; and the right eye image data is processed and displayed as the right eye image on the display screen 1031; the left eye image data corresponds to the left eye image; and the right eye image data corresponds to the right eye image.

The first compensation image data is acquired on the basis of the left eye image data and the right eye image data, and the second compensation image data is also acquired on the basis of the left eye image data and the right eye image data; further, the first compensation image can be acquired on the basis of the first compensation image data, and the second compensation image can be acquired on the basis of the second compensation image data; and after the first compensation image and the second compensation image are acquired, the first compensation image and the second compensation image can be displayed on the display screen 1031.

The method in the first embodiment of the application is implemented as follows.

In $\frac{1}{60}$ s for receiving a frame of 3D image, when the left eye image is displayed on the display screen 1031 in a first image display period $\frac{1}{240}$ s, meanwhile transmitting a first control signal to 3D glasses 20, so that the 3D glasses 20 can allow the left spectacle lens 201 to be in an open state and allow the right spectacle lens 202 to be in a closed state based on the first control signal, so that a user can see the left eye image displayed on the display screen 1031 through the left spectacle lens 201; and in a third image display period $\frac{1}{240}$ s, when the right eye image is displayed on the display screen 1031, meanwhile transmitting a second control signal to the 3D glasses 20, so that the 3D glasses 20 can allow the right spectacle lens 202 to be in an open state and allow the left spectacle lens 201 to be in a closed state based on the second control signal, so that the user can see the right eye image displayed on the display screen 1031 through the right spectacle lens 202, then a complete 3D image can be formed in the brain of the user, and so on, and complete 3D video images can be formed.

In the embodiment of the application, in the frame of 3D image $\frac{1}{60}$ s, the superposed image of the left eye image, the first compensation image, the right eye image and the second compensation image displayed on the display screen 1031 is the left eye image or the right eye image; and human eyes see the superposed image in $\frac{1}{60}$ s, and the superposed image is a 2D image without double-image when the left eye image or the right eye image is separately played, so that clear 2D video images without double-image can be realized.

In the step S13 of the embodiment, the left eye image acquired on the basis of the left eye image data is displayed on the display screen 1031 in the first image display period $\frac{1}{240}$ s, and the right eye image acquired on the basis of the right eye image data is displayed on the display screen 1031 in the third image display period $\frac{1}{240}$ s, wherein the left eye image displayed in the first image display period and the right eye image displayed in the third image display period can be exchanged to be displayed, and after exchanging, the right eye image acquired on the basis of the right eye image data can be displayed on the display screen 1031 in the first image display period $1/240$ s, and the left eye image acquired on the basis of the left eye image data can be displayed on the display screen 1031 in the third image display period $1/240$ s.

In this case, the left eye image and the right eye image are exchanged to be displayed, the display effect is not changed, and the same display effect is achieved, correspondingly, the switching time sequence of the spectacle lenses of the 3D glasses shall be adjusted.

Further, for step S12, acquiring the first compensation image data and the second compensation image data includes:
    acquiring the first compensation image data and the second compensation image data on the basis of the left eye image data and the right eye image data.

Further, acquiring the first compensation image data and the second compensation image data on the basis of the left eye image data and the right eye image data includes:
    processing the left eye image data and the right eye image data based on a formula $W+W'=(n-1)L-R$ or a formula $W+W'=(n-1)R-L$ to acquire the first compensation image data and the second compensation image data, wherein L is data of the ith pixel point in the left eye image data, R is data of the ith pixel point in the right eye image data, W is data of the ith pixel point in the first compensation image data, W' is data of the ith pixel point in the second compensation image data, n is a natural number larger than 2, and i is an integer larger than or equal to 1.

In this case, i is an integer larger than or equal to 1. Based on the formula $W+W'=(n-1)L-R$ or the formula $W+W'=(n-1)R-L$, pixel points are sequentially calculated from the first pixel point of each of the left eye image data and the right eye image data to acquire first compensation image data and second compensation image data, wherein, the first compensation image data and the second compensation image data consist of the first pixel point data to the last pixel point data respectively.

In this case, the first compensation image data and the second compensation image data are acquired on the basis of the formula $W+W'=(n-1)L-R$, and the left eye image, the first compensation image, the right eye image and the second compensation image are displayed on the display screen 1031 as the left eye image; the first compensation image data and the second compensation image data are acquired on the basis of the formula $W+W'=(n-1)R-L$, and the left eye image, the first compensation image, the right eye image and the second compensation image are displayed on the display screen 1031 as the right eye image; under the condition that the 3D glasses are not worn, the images watched on the display screen 1031 are left eye images based on the formula $W+W'=(n-1)L-R$, the images watched on the display screen 1031 are right eye images based on the formula $W+W'=(n-1)R-L$, and the left eye images and the right eye images are the same scene under different viewing angles, so the 2D effects displayed by the left eye images and the right eye images are the same; and based on the formula $W+W'=(n-1)L-R$ and the formula $W+W'=(n-1)R-L$, the technical solutions of the application are implemented, and the effects of the acquired 2D images without double-image are the same.

Further, when n is equal to 4, processing the left eye image data and the right eye image data based on the formula $W+W'=(n-1)L-R$ or the formula $W+W'=(n-1)R-L$ to acquire the first compensation image data and the second compensation image data includes:
    processing the left eye image data and the right eye image data based on a formula $W+W'=3L-R$ or a formula $W+W'=3R-L$ to acquire the first compensation image data and the second compensation image data.

In this case, when n is equal to 4, 4 is an optimal solution of n, the first compensation image data and the second compensation image data are acquired by processing the left eye image data and the right eye image data based on the formula $W+W'=3L-R$ or the formula $W+W'=3R-L$; when a frame of 3D image is input, four frames of images, namely the left eye image, the first compensation image, the right eye image and the second compensation image displayed on the display screen 1031 are acquired; because n is 4, the superposition effect of the four frames of images is just equivalent to the image effect achieved by displaying 4 frames of left images or 4 frames of right images on the display screen 1031; and the number of the frames of the images is not increased or reduced, and the optimal brightness effect of the 2D images can be achieved.

In this case, n can also be 3, and the first compensation image data and the second compensation image data are acquired on the basis of the formula $W+W'=2L-R$ or the formula $W+W'=2R-L$; when a frame of 3D image is input, four frames of images, namely the left eye image, the first compensation image, the right eye image and the second compensation image displayed on the display screen 1031 are acquired, and the superposition effect of the four frames of images is equivalent to the superposition effect of displaying 3 frames of left eye images or 3 frames of right eye images and 1 frame of black field image; and due to the presence of the 1 frame of black field image, the brightness of achieved 2D image effect is reduced.

In this case, n can also be 5, and the first compensation image data and the second compensation image data are acquired on the basis of the formula $W+W'=4L-R$ or the formula $W+W'=4R-L$; when a frame of 3D image is input, four frames of images, namely the left eye image, the first compensation image, the right eye image and the second compensation image displayed on the display screen 1031 are acquired, and the superposition effect of the four frames of images is equivalent to the superposition effect of displaying 5 frames of left eye images or 5 frames of right eye images; and because it is equivalent to add 1 frame of image, the brightness of achieving the 2D image effect is improved, but the brightness of the 2D images is easily too high to cause brightness saturation.

In a similar way, n can also be a natural number larger than 5, but brightness saturation is easily caused when achieving the 2D image effect.

Further, when W is the same as W', processing the left eye image data and the right eye image data based on the formula $W+W'=3L-R$ or the formula $W+W'=3R-L$ to acquire the first compensation image data and the second compensation image data includes:
    processing the left eye image data and the right eye image data based on a formula $W=W'=(3L-R)/2$ or a formula $W=W'=(3R-L)/2$ to acquire the first compensation image data and the second compensation image data, wherein the first compensation image data is the same as the second compensation image data.

In this case, the formula $W=W'=(3L-R)/2$ or the formula $W=W'=(3R-L)/2$ is an optimal value solution of W and W'; the method for acquiring the first compensation image data and the second compensation image data is simple; and R, L, W and W' have low difference, so that the brightness uniformity of the left eye image, the first compensation image, the right eye image and the second compensation image is better.

In this case, the 2D image effects achieved on the basis of the formula W=W'=(3L−R)/2 and the formula W=W'=(3R−L)/2 are the same.

In a similar way, W and W' can be different; and different W and W' can be acquired on the basis of the formula W+W'=3L−R or the formula W+W'=3R−L.

For example, W=2L−R and W'=L as well as W=L and W'=2L−R can be acquired on the basis of the formula W+W'=3L−R; and W=2R−L and W'=R as well as W=R and W'=2R−L can be acquired on the basis of the formula W+W'=3R−L, and so on, and description is omitted here.

Figure 3:
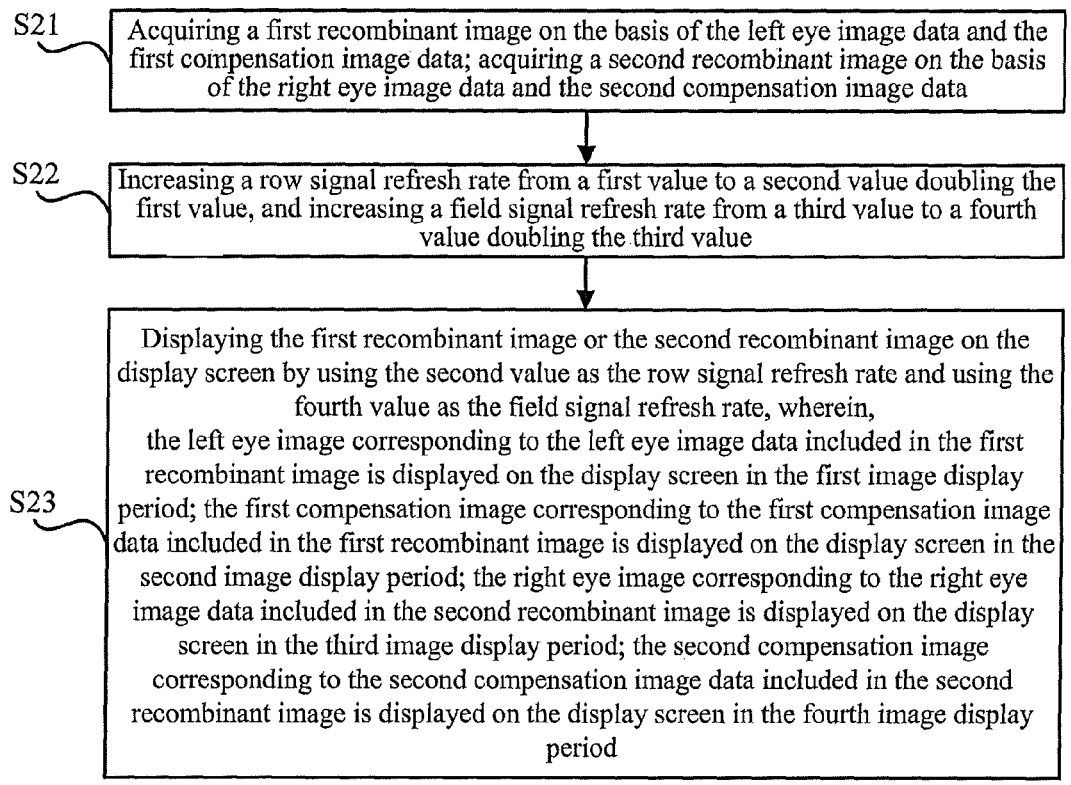
FIG. 3 is a implementation flow chart of a step S13 in the first embodiment of the application.

Further, the step S13 is explained. As shown in FIG. 3, FIG. 3 is the implementation flow chart of the step S13 in the first embodiment.

In the step S13, the left eye image acquired on the basis of the left eye image data is displayed on the display screen 1031 in the first image display period 1/240 s; the first compensation image acquired on the basis of the first compensation image data is displayed on the display screen 1031 in the second image display period 1/240 s; the right eye image acquired on the basis of the right eye image data is displayed on the display screen 1031 in the third image display period 1/240 s; the second compensation image acquired on the basis of the second compensation image data is displayed on the display screen 1031 in the fourth image display period 1/240 s; and the step S13 includes the following steps.

Step S21: acquiring a first recombinant image on the basis of the left eye image data and the first compensation image data; and acquiring a second recombinant image on the basis of the right eye image data and the second compensation image data;

Step S22: increasing a row signal refresh rate from a first value 120*1080 Hz to a second value 240*1080 Hz doubling the first value, and increasing a field signal refresh rate from a third value 120 Hz to a fourth value 240 Hz doubling the third value.

Step S23: displaying the first recombinant image or the second recombinant image on the display screen 1031 by using the second value 240*1080 Hz as the row signal refresh rate and using the fourth value 240 Hz as the field signal refresh rate, wherein, the left eye image corresponding to the left eye image data included in the first recombinant image is displayed on the display screen 1031 in the first image display period 1/240 s;

the first compensation image corresponding to the first compensation image data included in the first recombinant image is displayed on the display screen 1031 in the second image display period 1/240 s;

the right eye image corresponding to the right eye image data included in the second recombinant image is displayed on the display screen 1031 in the third image display period 1/240 s; and the second compensation image corresponding to the second compensation image data included in the second recombinant image is displayed on the display screen 1031 in the fourth image display period 1/240 s.

Further, the step S21 of acquiring the first recombinant image on the basis of the left eye image data and the first compensation image data includes:

acquiring a first half field image on the basis of the left eye image data and acquiring a second half field image on the basis of the first compensation image data; and acquiring the first recombinant image on the basis of the first half field image and the second half field image.

The step of acquiring the second recombinant image on the basis of the right eye image data and the second compensation image data includes:

acquiring a first half field image on the basis of the right eye image data and acquiring a second half field image on the basis of the second compensation image data; and acquiring the second recombinant image on the basis of the first half field image and the second half field image.

Further, the step S22 of increasing the row signal refresh rate from the first value 120*1080 Hz to the second value 240*1080 Hz doubling the first value includes:

continuously generating two pulse rising edges, namely a first pulse rising edge and a second pulse rising edge in an original row synchronous signal pulse period, to increase the row signal refresh rate from the first value 120*1080 Hz to the second value 240*1080 Hz doubling the first value;

the step of increasing the field signal refresh rate from the third value 120 Hz to the fourth value 240 Hz doubling the third value includes:

continuously generating two pulse rising edges, namely a third pulse rising edge and a fourth pulse rising edge in an original field synchronous signal pulse period, to increase the field signal refresh rate from the third value 120 Hz to the fourth value 240 Hz doubling the third value.

Figure 4:
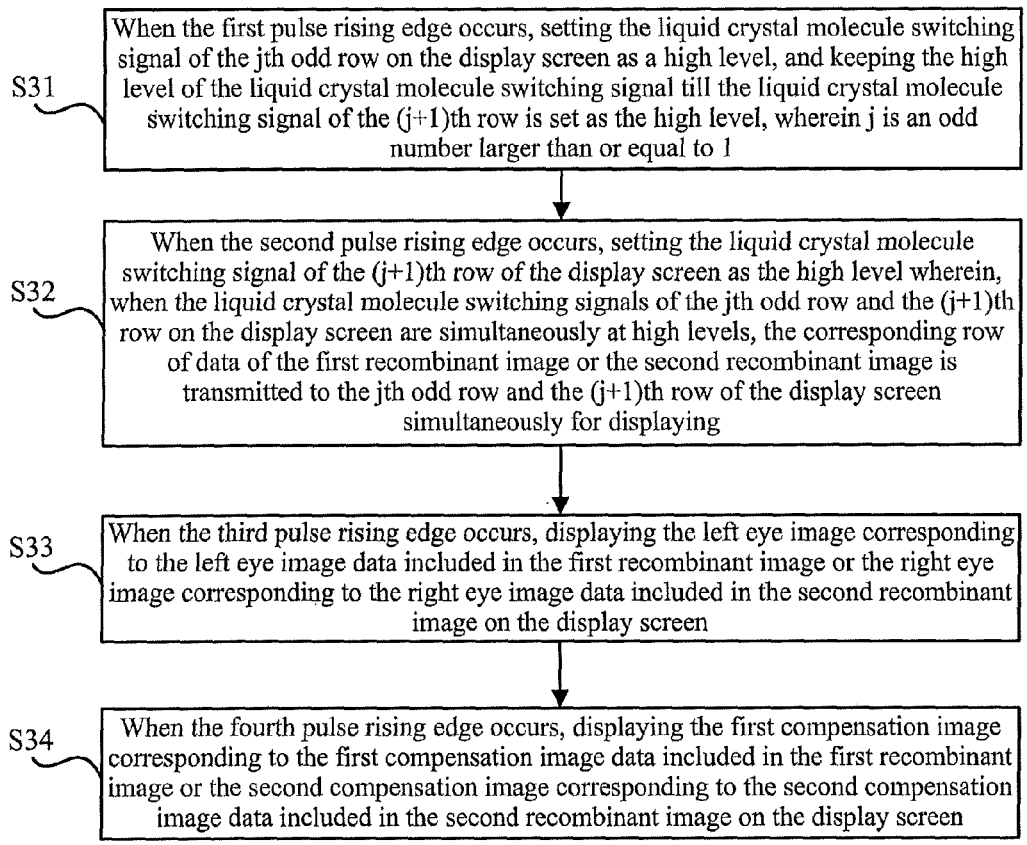
FIG. 4 is a implementation flow chart of a step S23 in the first embodiment of the application.

Further, for the step S23, as shown in FIG. 4, FIG. 4 is the implementation flow chart of the step S23 in the first embodiment. The step of displaying the first recombinant image or the second recombinant image on the display screen 1031 by using the second value 240*1080 Hz as the row signal refresh rate and using the fourth value 240 Hz as the field signal refresh rate includes the following steps.

Step S31: when the first pulse rising edge occurs, setting the liquid crystal molecule switching signal of the jth odd row of the display screen 1031 as a high level, and keeping the high level of the liquid crystal molecule switching signal till the liquid crystal molecule switching signal of the (j+1)th row is set as the high level, wherein j is an odd larger than or equal to 1.

Step S32: when the second pulse rising edge occurs, setting the liquid crystal molecule switching signal of the (j+1)th row on the display screen 1031 as the high level;

wherein, when the liquid crystal molecule switching signals of the jth odd row and the (j+1)th row on the display screen 1031 are simultaneously set as high levels, the corresponding row of data of the first recombinant image or the second recombinant image is transmitted to the jth odd row and the (j+1)th row of the display screen 1031 simultaneously for displaying;

Step S33: when the third pulse rising edge occurs, displaying the left eye image corresponding to the left eye image data included in the first recombinant image or the right eye image corresponding to the right eye image data included in the second recombinant image on the display screen 1031.

Step S34: when the fourth pulse rising edge occurs, displaying the first compensation image corresponding to the first compensation image data included in the first recombinant image or the second compensation image corresponding to the second compensation image data included in the second recombinant image on the display screen 1031.

Figure 5:
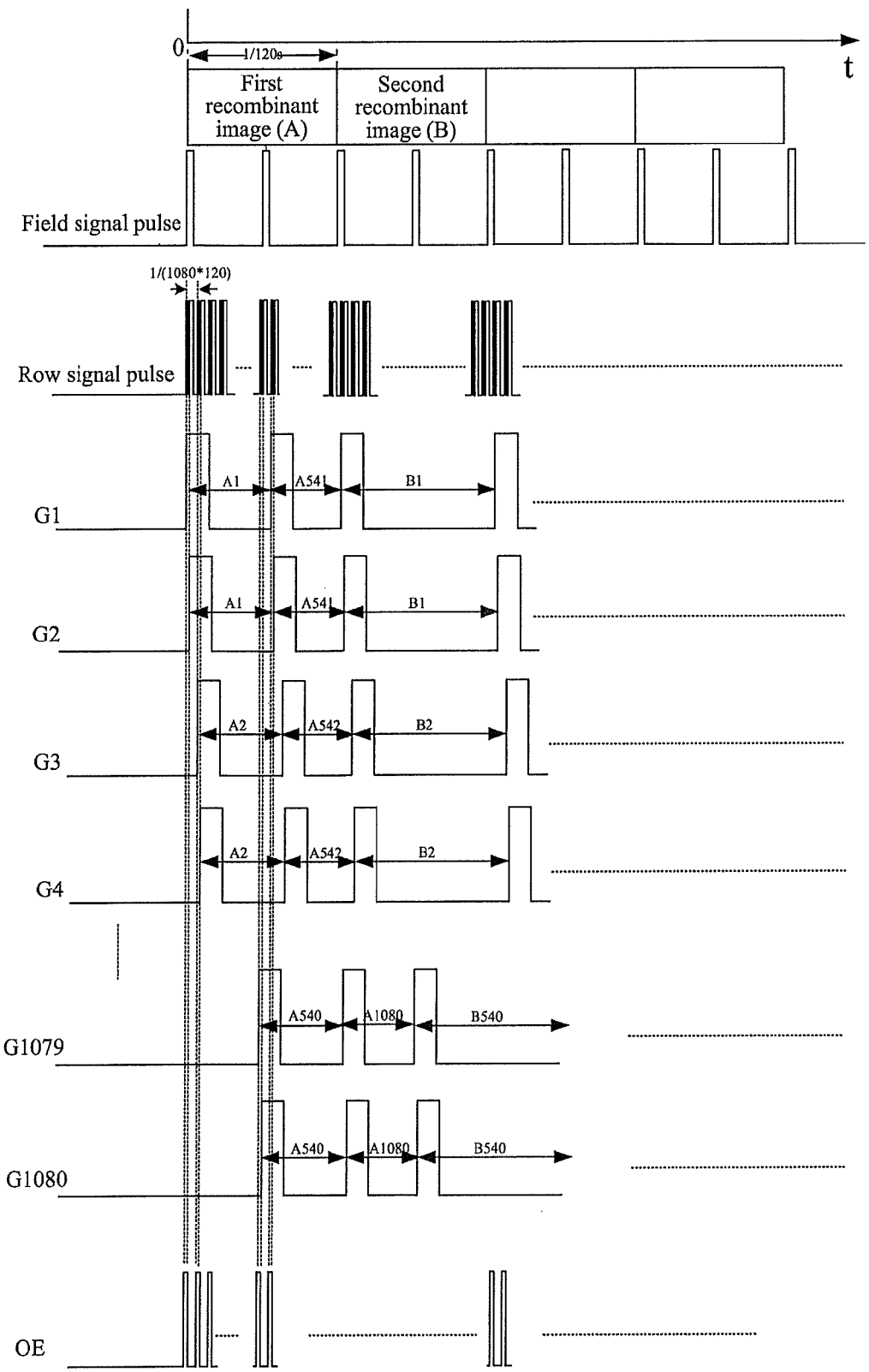
FIG. 5 is a signal refresh time sequence diagram of the step S23 in the first embodiment of the application.

For understanding, the first recombinant image or the second recombinant image is displayed on the display screen 1031 by using the second value 240*1080 Hz as the row signal refresh rate and using the fourth value 240 Hz as the field signal refresh rate in the step S23 is explained. As shown in FIG. 5, FIG. 5 is a further signal fresh time sequence diagram of the step S23 in the first embodiment; by taking a 1920*1080/120 Hz liquid crystal screen as an example, in an input period 1/60 s of a frame of 3D image, when a group of the first recombinant image and the second recombinant image are displayed on the display screen 1031, the whole image refresh process is explained.

In this case, in the input period 1/60 s of a frame of 3D image, by using the fourth value 240 Hz as the field signal fresh rate, totally 4 field signal pulses are generated, namely four image display periods; and by using the second value 240*1080 Hz as the row signal refresh rate, totally 1,080 row signal pulses are generated in each of the image display periods, namely 1,080 rows of data are refreshed. The four image display periods are as follows.

In the first image display period 1/240 s, the left eye image corresponding to the left eye image data included in the first recombinant image is displayed on the display screen 1031, where:

when the first field signal pulse rising edge occurs and the row signal pulse generates the first rising edge, the first row of liquid crystal molecule switching signal G1 is at a high level; the row signal pulse generates the second rising edge in extremely short time, the second row of liquid crystal molecule switching signal G2 is at the high level; when G1 and G2 are at the high level at the same time, an image data enabling signal OE is set to be low, and the first row of image data of the first recombinant image is transmitted to the first row and the second row of the display screen 1031 for refreshing and displaying; then, when the row signal pulse generates the third rising edge, the third row of liquid crystal molecule switching signal G3 is at the high level; the row signal pulse generates the fourth rising edge in extremely short time, the fourth row of liquid crystal molecule switching signal G4 is at the high level; when G3 and G4 are at the high level at the same time, the image data enabling signal OE is set to be low, the second row of image data of the first recombinant image is transmitted to the third row and the fourth row of the display screen 1031 for refreshing and displaying, and so on; when the row signal pulse generates the 1,079th rising edge, the 1,079th row of liquid crystal molecule switching signal G1,079 is at the high level; the row signal pulse generates the 1,080th rising edge in extremely short time, and the 1,080th row of liquid crystal molecule switching signal G1,080 is at the high level; when G1,079 and G1,080 are at the high level at the same time, the image data enabling signal OE is set to be low, and the 540th row of image data of the first recombinant image is transmitted to the 1,079th row and the 1,080th row of the display screen 1031 for refreshing and displaying; and the first half field image data of the first recombinant image is refreshed and displayed on the display screen 1031 for a screen of image, namely the left eye image corresponding to the left eye image data of the first half field image of the first recombinant image is displayed on the display screen 1031, so that display of the left eye image is completed.

In the second image display period 1/240 s, the first compensation image corresponding to the first compensation image data included in the first recombinant image is displayed on the display screen 1031, where:

when the second field signal pulse rising edge occurs and the row signal pulse generates the first rising edge, the first row of liquid crystal molecule switching signal G1 is at a high level; the row signal pulse generates the second rising edge in extremely short time, the second row of liquid crystal molecule switching signal G2 is at the high level; when G1 and G2 are at the high level at the same time, an image data enabling signal OE is set to be low, and the 541st row of image data of the first recombinant image is transmitted to the first row and the second row of the display screen 1031 for refreshing and displaying; then, when the row signal pulse generates the third rising edge, the third row of liquid crystal molecule switching signal G3 is at the high level; the row signal pulse generates the fourth rising edge in extremely short time, the fourth row of liquid crystal molecule switching signal G4 is at the high level; when G3 and G4 are at the high level at the same time, the image data enabling signal OE is set to be low, the 542nd row of image data of the first recombinant image is transmitted to the third row and the fourth row of the display screen 1031 for refreshing and displaying, and so on; when the row signal pulse generates the 1,079th rising edge, the 1,079th row of liquid crystal molecule switching signal G1,079 is at the high level; the row signal pulse generates the 1,080th rising edge in extremely short time, and the 1,080th row of liquid crystal molecule switching signal G1,080 is at the high level; when G1,079 and G1,080 are at the high level at the same time, the image data enabling signal OE is set to be low, and the 1,080th row of image data of the first recombinant image is transmitted to the 1,079th row and the 1,080th row of the display screen 1031 for refreshing and displaying; and the second half field image data of the first recombinant image is refreshed and displayed on the display screen 1031 for a screen of image, namely the first compensation image corresponding to the first compensation image data of the second half field image of the first recombinant image is displayed on the display screen 1031, so that display of the first compensation image is completed.

In the third image display period 1/240 s, the right eye image corresponding to the right eye image data included in the second recombinant image is displayed on the display screen 1031, where:

when the third field signal pulse rising edge occurs and the row signal pulse generates the first rising edge, the first row of liquid crystal molecule switching signal G1 is at a high level; the row signal pulse generates the second rising edge in extremely short time, the second row of liquid crystal molecule switching signal G2 is at the high level; when G1 and G2 are at the high level at the same time, an image data enabling signal OE is set to be low, and the first row of image data of the second recombinant image is transmitted to the first row and the second row of the display screen 1031 for refreshing and displaying; then, when the row signal pulse generates the third rising edge, the third row of liquid crystal molecule switching signal G3 is at the high level; the row signal pulse generates the fourth rising edge in extremely short time, the fourth row of liquid crystal molecule switching signal G4 is at the high level; when G3 and G4 are at the high level at the same time, the image data enabling signal OE is set to be low, the second row of image data of the second recombinant image is transmitted to the third row and the fourth row of the display screen 1031 for refreshing and displaying, and so on; when the row signal pulse generates the 1,079th rising edge, the 1,079th row of liquid crystal molecule switching signal G1,079 is at the high level; the row signal pulse generates the 1,080th rising edge in extremely short time, and the 1,080th row of liquid crystal molecule switching signal G1,080 is at the high level; when G1,079 and G1,080 are at the high level at the same time, the image data enabling signal OE is set to be low, and the 540th row of image data of the second recombinant image is transmitted to the 1,079th row and the 1,080th row of the display screen 1031 for refreshing and displaying; and the first half field image data of the second recombinant image is refreshed and displayed on the display screen 1031 for a screen of image, namely the right eye image corresponding to the right eye image data of the first half field image of the second recombinant image is displayed on the display screen 1031, so that display of the right eye image is completed.

In the fourth image display period 1/240 s, the second compensation image corresponding to the second compensation image data included in the second recombinant image is displayed on the display screen 1031, where:

when the fourth field signal pulse rising edge occurs and the row signal pulse generates the first rising edge, the first row of liquid crystal molecule switching signal G1 is at a high level; the row signal pulse generates the second rising edge in extremely short time, the second row of liquid crystal molecule switching signal G2 is at the high level; when G1 and G2 are at the high level at the same time, an image data enabling signal OE is set to be low, and the 541st row of image data of the second recombinant image is transmitted to the first row and the second row of the display screen 1031 for refreshing and displaying; then, when the row signal pulse generates the third rising edge, the third row of liquid crystal molecule switching signal G3 is at the high level; the row signal pulse generates the fourth rising edge in extremely short time, the fourth row of liquid crystal molecule switching signal G4 is at the high level; when G3 and G4 are at the high level at the same time, the image data enabling signal OE is set to be low, the 542nd row of image data of the second recombinant image is transmitted to the third row and the fourth row of the display screen 1031 for refreshing and displaying, and so on; when the row signal pulse generates the 1,079th rising edge, the 1,079th row of liquid crystal molecule switching signal G1,079 is at the high level; the row signal pulse generates the 1,080th rising edge in extremely short time, and the 1,080th row of liquid crystal molecule switching signal G1,080 is at the high level; when G1,079 and G1,080 are at the high level at the same time, the image data enabling signal OE is set to be low, and the 1,080th row of image data of the second recombinant image is transmitted to the 1,079th row and the 1,080th row of the display screen 1031 for refreshing and displaying; and the second half field image data of the second recombinant image is refreshed and displayed on the display screen 1031 for a screen of image, namely the second compensation image corresponding to the second compensation image data of the second half field image of the second recombinant image is displayed on the display screen 1031, so that display of the second compensation image is completed.

In this case, when a 3D display is realized for the frame of 3D image in the prior art, the left eye image and the right eye image separated from the 3D image with the data transmission frequency of 60 Hz are refreshed and displayed respectively, so the 3D image with the transmission frequency of 60 Hz is separated into left eye image data and right eye image data of 120 Hz, wherein, the left eye image data and the right eye image data of 120 Hz are refreshed and displayed on the display screen 1031 by using the field signal refresh rate of 120 Hz and the row signal refresh rate of 120*1080 Hz.

In the embodiment, the first compensation image data and the second compensation image data are respectively inserted into the left eye image data and the right eye image data of 120 Hz to generate first recombinant image data and second recombinant image data of 120 Hz, wherein, the same row of the first recombinant image data and the second recombinant image data of 120 Hz is transmitted to two rows on the display screen 1031 and refreshed and displayed by using the field signal refresh rate of 240 Hz and the row signal refresh rate of 240*1080 Hz, so the first recombinant image data or the second recombinant image data is displayed into two screens on the display screen 1031, namely the upper half image data and the lower half image data of the first recombinant image data are respectively displayed as the left eye image and the first compensation image on the display screen, and the upper half image data and the lower half image data of the second recombinant image are correspondingly displayed as the right eye image and the second compensation image on the display screen.

Second Embodiment

The embodiment provides an image display method. The method is applied to an image display device, and in practice, the image display device can be a television or network video play equipment or the like. In the embodiment of the application, the image display device is illustrated by taking a 1920*1080/240 Hz liquid crystal television as an example.

As shown FIG. 9, the method in the second embodiment is also applied to the image display device. The image display device includes:

an image signal receiving unit 101, configured to receive a frame of 3D image, wherein the 3D image includes left eye image data and right eye image data;

an image data calculating unit 102, connected with the image signal receiving unit 101 and configured to calculate on the basis of the left eye image data and the right eye image data to acquire first compensation image data and second compensation image data;

a display unit 103, the display unit 103 capable of being connected with 3D glasses 20 and including a display screen 1031 and a control signal transmitting unit 1032, wherein the 3D glasses 20 include a left spectacle lens 201, a right spectacle lens 202 and a control signal receiving unit 203, wherein, in a first image display period, a left eye image acquired on the basis of the left eye image data is displayed on the display screen 1031, and meanwhile a first control signal is transmitted to the 3D glasses 20 through the control signal transmitting unit 1032, wherein the 3D glasses 20 can receive the first control signal through the control signal receiving unit 203 and allow the left spectacle lens 201 to be in an open state and allow the right spectacle lens 202 to be in a closed state under the control of the first control signal;

in a second image display period, a first compensation image acquired on the basis of the first compensation image data is displayed on the display screen 1031, wherein in the second image display period, both the left spectacle lens 201 and the right spectacle lens 202 of the 3D glasses 20 are in the closed state;

in a third image display period, a right eye image acquired on the basis of the right eye image data is displayed on the display screen 1031, and meanwhile a second control signal is transmitted to the 3D glasses 20 through the control signal transmitting unit 1032, wherein the 3D glasses 20 can receive the second control signal through the control signal receiving unit 203 and allow the right spectacle lens 202 to be in an open state and allow the left spectacle lens 201 to be in a closed state under the control of the second control signal; and in a fourth image display period, a second compensation image acquired on the basis of the second compensation image data is displayed on the display screen 1031, wherein in the fourth image display period, both the left spectacle lens 201 and the right spectacle lens 202 of the 3D glasses 20 are in the closed state;

wherein, the superposed image of the left eye image, the first compensation image, the right eye image and the second compensation image is the left eye image or the right eye image.

Next, the implementation process of the image display method in the second embodiment of the application is described in detail in an input period $1/60$ s of a frame of 3D image in conjunction with FIG. 2. The method includes the following steps.

Step S11: acquiring a frame of 60 Hz 3D image, wherein the 3D image includes left eye image data and right eye image data.

Step S12: acquiring first compensation image data and second compensation image data on the basis of the left eye image data and the right eye image data.

Step S13: in a first image display period $1/240$ s, displaying a left eye image acquired on the basis of the left eye image data on the display screen 1031, and meanwhile transmitting a first control signal to 3D glasses 20 matched with the liquid crystal television and including the left spectacle lens 201 and the right spectacle lens 202, wherein the 3D glasses 20 can allow the left spectacle lens 201 to be in an open state and allow the right spectacle lens 202 to be in a closed state based on the first control signal;

in a second image display period $1/240$ s, displaying a first compensation image acquired on the basis of the first compensation image data on the display screen 1031, wherein in the second image display period, both the left spectacle lens 201 and the right spectacle lens 202 of the 3D glasses 20 are in the closed state;

in a third image display period $1/240$ s, displaying a right eye image acquired on the basis of the right eye image data on the display screen 1031, and meanwhile transmitting a second control signal to the 3D glasses 20, wherein the 3D glasses 20 can allow the right spectacle lens 202 to be in an open state and allow the left spectacle lens 201 to be in a closed state based on the second control signal; and in a fourth image display period $1/240$ s, displaying a second compensation image acquired on the basis of the second compensation image data on the display screen 1031, wherein in the fourth image display period, both the left spectacle lens 201 and the right spectacle lens 202 of the 3D glasses 20 are in the closed state;

wherein, the superposed image of the left eye image, the first compensation image, the right eye image and the second compensation image is the left eye image or the right eye image.

The biggest difference between the second embodiment and the first embodiment is that double-row synchronous driving display is realized by adopting the 120 Hz liquid crystal screen in the first embodiment and the non-interlaced driving display is realized by adopting the 240 Hz liquid crystal screen in the second embodiment.

In this case, when the 120 Hz liquid crystal screen is adopted in the first embodiment, the liquid crystal screen is advantageous in cost, but when frequency doubling driving display is carried out on the liquid crystal screen, the optimal effect of the liquid crystal screen can not be achieved, the display effect is poorer than that of the 240 Hz liquid crystal screen, and the implementation mode is also limited to a certain degree.

When the 240 Hz liquid crystal screen is adopted in the second embodiment, non-interlaced refreshing display can be realized, the display effect is good, the implement modes are diverse, but the cost is higher than that of the first embodiment.

Steps S11 and S12 in the second embodiment are the same as those in the method of the first embodiment and the description thereof is omitted here.

The difference between the second embodiment and the first embodiment, i.e., step S13, is described in detail below.

Further, the step S13 is explained, only three implementations are listed for step S13 in the present application, those skilled in the art can make other solutions without inventive work according to the technical solution in the present application, and the present application does not list one by one.

Figure 6:
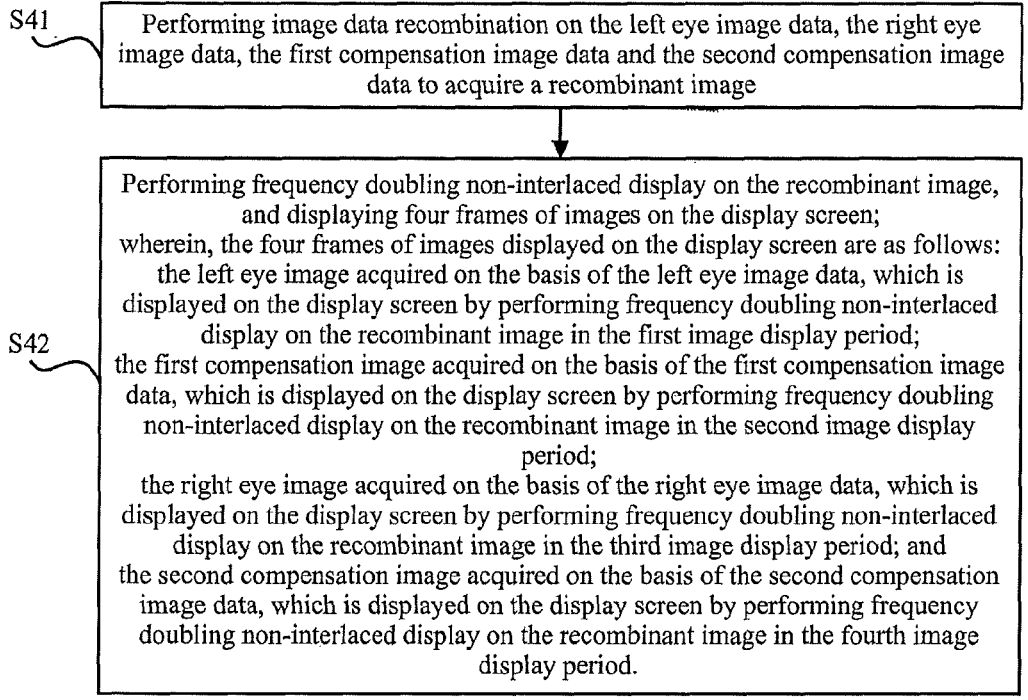
FIG. 6 is a first implementation flow chart of the step S13 in a second embodiment of the application.

The first implementation of the step S13 is as shown in FIG. 6, and FIG. 6 is a first implementation flow chart of the step S13 in the second embodiment. In the step S13, the left eye image acquired on the basis of the left eye image data is displayed on the display screen 1031 in the first image display period $1/240$ s; the first compensation image acquired on the basis of the first compensation image data is displayed on the display screen 1031 in the second image display period $1/240$ s; the right eye image acquired on the basis of the right eye image data is displayed on the display screen 1031 in the third image display period $1/240$ s; the second compensation image acquired on the basis of the second compensation image data is displayed on the display screen 1031 in the fourth image display period $1/240$ s, the step S13 includes the following steps.

Step S41: performing image data recombination on the left eye image data, the right eye image data, the first compensation image data and the second compensation image data to acquire a recombinant image.

In the present technical solution, alternatively, the left eye image data, the right eye image data, the first compensation image data and the second compensation image data can be recombined to acquire four fields of image data, wherein the first field is the left eye image data, the second field is the first compensation image data, the third field is the right eye image data and the four field is the second compensation image data.

Step S42: displaying four field of images on the display screen 1031;

wherein, displaying the four frames of images on the display screen is as follows: the left eye image acquired on the basis of the left eye image data is displayed on the display screen in the first image display period;

the first compensation image acquired on the basis of the first compensation image data is displayed on the display screen in the second image display period;

the right eye image acquired on the basis of the right eye image data is displayed on the display screen in the third image display period; and the second compensation image acquired on the basis of the second compensation image data is displayed on the display screen in fourth image display period.

Further, the step S41 of performing image data recombination on the left eye image data, the right eye image data, the first compensation image data and the second compensation image data to acquire the recombinant image includes:

performing data compression on the left eye image data, the right eye image data, the first compensation image data and the second compensation image data to acquire a frame of recombinant image;

wherein the frame of recombinant image includes the left eye image data, the right eye image data, the first compensation image data and the second compensation image data.

The frame of recombinant image is subjected to four-frequency doubling non-interlaced display in the embodiment, and four frames of images are displayed on the display screen 1031, namely in the first image display period, data of row points and field lines is respectively frequency doubled based on the left eye image data, and the left eye image is displayed on the display screen 1031; in the second image display period, data of row points and field lines is respectively frequency doubled based on the first compensation image data, and the first compensation image is displayed on the display screen 1031; in the third mage display period, data of row points and field lines is respectively frequency doubled based on the right eye image data, and the right eye image is displayed on the display screen 1031; and in the fourth image display period, data of row points and field lines is respectively frequency doubled based on the second compensation image data, and the second compensation image is displayed on the display screen 1031.

In the embodiment, the row points and the field lines are magnified one time by adopting an MEMC (Motion Estimate and Motion Compensation) processed interpolation method, for example, a mid-value interpolating method is adopted, namely a mean of data of two adjacent points of the same row or the same column is interpolated in the middle of the data of the two points; or a same value interpolating method is adopted, namely the data of the upper adjacent point or the lower adjacent point is interpolated in the middle of the data of the two points of the same row or the same column, and other MEMC processed interpolation methods are not listed here one by one.

Figure 7:
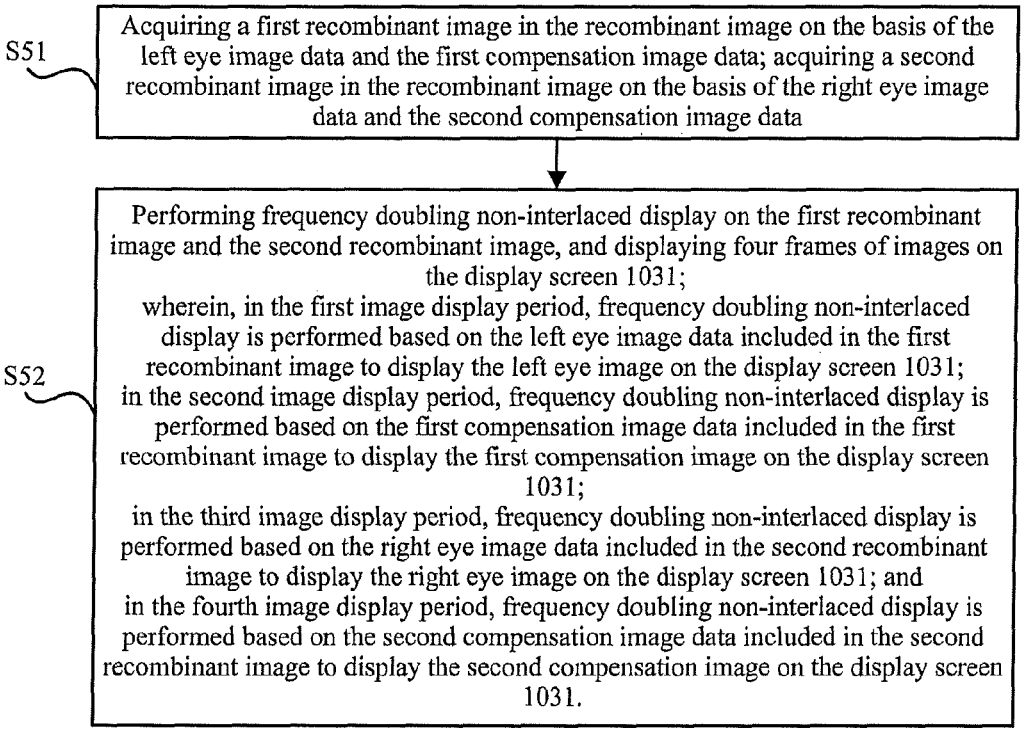
FIG. 7 is a second implementation flow chart of the step S13 in the second embodiment of the application.

Comparably, a second implementation of the step S13 is as shown in FIG. 7. FIG. 7 is a second implementation flow chart of the step S13 in the second embodiment. The step S13 includes the following steps.

Step S51: acquiring a first recombinant image in the recombinant image on the basis of the left eye image data and the first compensation image data; acquiring a second recombinant image in the recombinant image on the basis of the right eye image data and the second compensation image data.

Step S52: performing frequency doubling non-interlaced display on the first recombinant image and the second recombinant image, and displaying four frames of images on the display screen;

wherein, in the first image display period, frequency doubling non-interlaced driving display is performed on the first recombinant image in the recombinant image, and the left eye image acquired on the basis of the left eye image data included in the first recombinant image is displayed on the display screen;

in the second image display period, performing frequency doubling non-interlaced driving display on the first recombinant image in the recombinant image, and the first compensation image acquired on the basis of the first compensation image data included in the first recombinant image is displayed on the display screen;

in the third image display period, performing frequency doubling non-interlaced driving display on the second recombinant image in the recombinant image, and the right eye image acquired on the basis of the right eye image data included in the second recombinant image is displayed on the display screen; and in the fourth image display period, performing frequency doubling non-interlaced driving display on the second recombinant image in the recombinant image, and the second compensation image acquired on the basis of the second compensation image data included in the second recombinant image is displayed on the display screen.

In the embodiment, the first recombinant image is acquired on the basis of the left eye image data and the first compensation image data, the second recombinant image is acquired on the basis of the right eye image data and the second compensation image data, the 3D image is processed into the first recombinant image and the second recombinant image, and the first recombinant image and the second recombinant image are displayed as four frames of images by frequency doubling magnified non-interlaced display.

In this case, when each of the left eye image data and the right eye image data included in the 3D image is formed in a format of upper and lower parts, the first recombinant image consists of upper and lower parts, wherein the upper part is the left eye image data, and the lower part is the first compensation image data; the second recombinant image consists of upper and lower parts, wherein the upper part is the right eye image data, and the lower part is the second compensation image data; when frequency doubling magnified non-interlaced display is performed on the first recombinant image and the second recombinant image, field lines are required to be magnified one time to display four frames of images, namely the left eye image is displayed on the display screen 1031 by magnifying the field lines of the left eye image data included in the first recombinant image one time for frequency doubling non-interlaced display in the first image display period, the first compensation image is displayed on the display screen 1031 by magnifying the field lines of the first compensation image data included in the first recombinant image one time for frequency doubling non-interlaced display in the second image display period, the right eye image is displayed on the display screen 1031 by magnifying the field lines of the right eye image data included in the second recombinant image one time for frequency doubling non-interlaced display in the third image display period, and the second compensation image is displayed on the display screen 1031 by magnifying the field lines of the second compensation image data included in the second recombinant image one time for frequency doubling non-interlaced display in the fourth image display period.

When each of the left eye image data and the right eye image data included in the frame of 3D image is formed in a format of left and right parts, the first recombinant image consists of left and right parts, wherein the left part is the left eye image data, and the right part is the first compensation image data; the second recombinant image consists of left and right parts, wherein the left part is the right eye image data, and the right part is the second compensation image data; when frequency doubling magnified non-interlaced display is performed on the first recombinant image and the second recombinant image, row points are required to be magnified one time to display four frames of images, namely the left eye image is displayed on the display screen 1031 by magnifying the row points of the left eye image data included in the first recombinant image one time for frequency doubling non-interlaced display in the first image display period, the first compensation image is displayed on the display screen 1031 by magnifying the row points of the first compensation image data included in the first recombinant image one time for frequency doubling non-interlaced display in the second image display period, the right eye image is displayed on the display screen 1031 by magnifying the row points of the right eye image data included in the second recombinant image one time for frequency doubling non-interlaced display in the third image display period, and the second compensation image is displayed on the display screen 1031 by magnifying the row points of the second compensation image data included in the second recombinant image one time for frequency doubling non-interlaced display in the fourth image display period.

Herein, in the embodiment, the row points and the field lines are magnified one time by adopting an MEMC (Motion Estimate and Motion Compensation) processed interpolation method, for example, a mid-value interpolating method is adopted, namely a mean of data of two adjacent points of the same row or the same column is interpolated in the middle of the data of the two points; or a same value interpolating method is adopted, namely the data of the upper adjacent point or the lower adjacent point is interpolated in the middle of the data of the two points of the same row or the same column, and other MEMC processed interpolation methods are not listed here one by one.

In the embodiment, the first recombinant image is acquired on the basis of the left eye image data and the first compensation image data, the second recombinant image is acquired on the basis of the right eye image data and the second compensation image data, and the left eye image data, the first compensation image data, the right eye image data and the second compensation image data are not required to be compressed and are directly recombined, so the data fidelity is high, the distortion of display images is reduced, and the second implementation in the embodiment is the optimal implementation.

Figure 8:
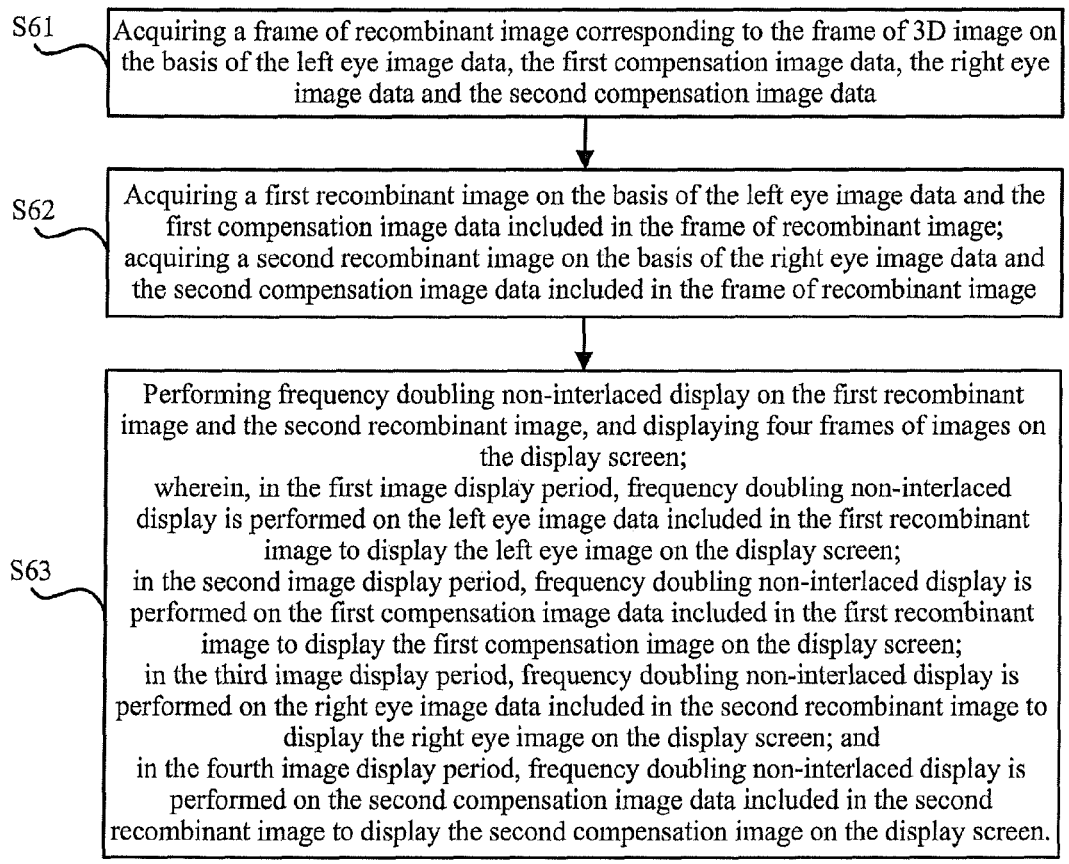
FIG. 8 is a third implementation flow chart of the step S13 in the second embodiment of the application.

Comparably, a third implementation of the step S13 is as shown in FIG. 8. FIG. 8 is a third implementation flow chart of the step S13 in the second embodiment. The step S13 includes the following steps.

Step S61: acquiring a frame of recombinant image corresponding to the 3D image on the basis of the left eye image data, the first compensation image data, the right eye image data and the second compensation image data.

Step S62: acquiring a first recombinant image based on the left eye image data and the first compensation image data included in the frame of recombinant image corresponding to the 3D image; and acquiring a second recombinant image on the basis of the right eye image data and the second compensation image data included in the frame of recombinant image corresponding to the 3D image.

Step S63: performing frequency doubling non-interlaced display on the first recombinant image and the second recombinant image, and displaying four frames of images on the display screen;

wherein, in the first image display period, frequency doubling non-interlaced display is performed based on the left eye image data included in the first recombinant image to display the left eye image on the display screen 1031;

in the second image display period, frequency doubling non-interlaced display is performed based on the first compensation image data included in the first recombinant image to display the first compensation image on the display screen 1031;

in the third image display period, frequency doubling non-interlaced display is performed based on the right eye image data included in the second recombinant image to display the right eye image on the display screen 1031; and in the fourth image display period, frequency doubling non-interlaced display is performed based on the second compensation image data included in the second recombinant image to display the second compensation image on the display screen 1031.

The difference between the third implementation of the step S13 in the embodiment and the second implementation is that a step is added before the second implementation: compressing the left eye image data, the right eye image data, the first compensation image data and the second compensation image data to acquire a frame of recombinant image.

Third Embodiment

The embodiment provides an image display device, as shown in FIG. 9. FIG. 9 is a frame diagram of the image display device in the third embodiment. The device includes:

an image signal receiving unit 101, configured to receive a frame of 3D image, wherein the 3D image includes left eye image data and right eye image data;

an image data calculating unit 102, connected with the image signal receiving unit 101 and configured to calculate on the basis of the left eye image data and the right eye image data to acquire first compensation image data and second compensation image data;

a display unit 103, capable of being connected with 3D glasses 20 and including a display screen 1031 and a control signal transmitting unit 1032, wherein the 3D glasses 20 include a left spectacle lens 201, a right spectacle lens 202 and a control signal receiving unit 203, wherein, in a first image display period, a left eye image acquired on the basis of the left eye image data is displayed on the display screen 1031, and meanwhile a first control signal is transmitted to the 3D glasses 20 through the control signal transmitting unit 1032, wherein the 3D glasses 20 can receive the first control signal through the control signal receiving unit 203 and allow the left spectacle lens 201 to be in an open state and allow the right spectacle lens 202 to be in a closed state under the control of the first control signal;

in a second image display period, a first compensation image acquired on the basis of the first compensation image data is displayed on the display screen 1031, wherein in the second image display period, both the left spectacle lens 201 and the right spectacle lens 202 of the 3D glasses 20 are in the closed state;

in a third image display period, a right eye image acquired on the basis of the right eye image data is displayed on the display screen 1031, and meanwhile a second control signal is transmitted to the 3D glasses 20 through the control signal transmitting unit 1032, wherein the 3D glasses 20 can receive the second control signal through the control signal receiving unit 203 and allow the right spectacle lens 202 to be in an open state and allow the left spectacle lens 201 to be in a closed state under the control of the second control signal; and in a fourth image display period, a second compensation image acquired on the basis of the second compensation image data is displayed on the display screen 1031, wherein in the fourth image display period, both the left spectacle lens 201 and the right spectacle lens 202 of the 3D glasses 20 are in the closed state;

wherein, the superposed image of the left eye image, the first compensation image, the right eye image and the second compensation image is the left eye image or the right eye image.

The image data calculating unit 102 is further configured to acquire the first compensation image data and the second compensation image data on the basis of the left eye image data and the right eye image data.

The image data calculating unit 102 is further configured to process the left eye image data and the right eye image data based on a formula $W+W'=(n-1)L-R$ or a formula $W+W'=(n-1)R-L$ to acquire the first compensation image data and the second compensation image data, wherein L is data of the ith pixel point in the left eye image data, R is data of the ith pixel point in the right eye image data, W is data of the ith pixel point in the first compensation image data, W' is data of the ith pixel point in the second compensation image data, n is a natural number larger than 2, and i is an integer larger than or equal to 1.

When n is equal to 4, the image data calculating unit 102 is further configured to process the left eye image data and the right eye image data based on a formula $W+W'=3L-R$ or a formula $W+W'=3R-L$ to acquire the first compensation image data and the second compensation image data.

When W is the same as W', the image data calculating unit 102 is configured to process the left eye image data and the right eye image data based on a formula $W=W'=(3L-R)/2$ or a formula $W=W'=(3R-L)/2$ to acquire the first compensation image data and the second compensation image data, wherein the first compensation image data is the same as the second compensation image data.

Figure 10:
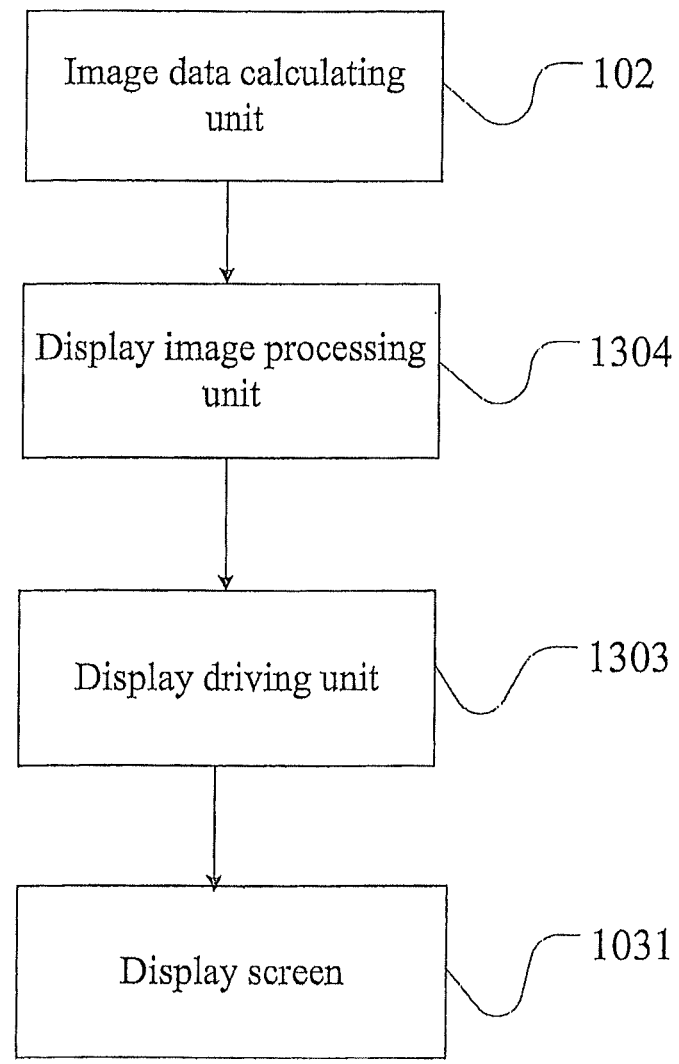
FIG. 10 is a frame diagram of a display unit in the device in the third embodiment of the application.

Further, as shown in FIG. 10, FIG. 10 is a frame diagram of the display unit 103 in the device of the second embodiment. The display unit 103 includes:
- a display image processing unit 1304, connected with the image data calculating unit 102, wherein the display image processing unit 1304 is configured to acquire a first recombinant image on the basis of the left eye image data and the first compensation image data;
- a display driving unit 1303, connected with the display image processing unit 1304, wherein the display driving unit 1303 is configured to increase a row signal refresh rate from a first value to a second value doubling the first value and increase a field signal refresh rate from a third value to a fourth value doubling the third value; and
- a display screen 1031, connected with the display driving unit 1303 and configured to display the left eye image corresponding to the left eye image data included in the first recombinant image in the first image display period and displaying the first compensation image corresponding to the first compensation image data included in the first recombinant image in the second image display period by using the second value as the row signal refresh rate and using the fourth value as the field signal refresh rate.

The display image processing unit 1304 is further configured to acquire a first half field image on the basis of the left eye image data and acquire a second half field image on the basis of the first compensation image data;
  wherein, the first recombinant image is acquired on the basis of the first half field image and the second half field image; and
  acquire a first half field image on the basis of the right eye image data and acquire a second half field image on the basis of the second compensation image data;
  wherein, the second recombinant image is acquired on the basis of the first half field image and the second half field image.

The display driving unit 1303 is further configured to:
continuously generate two pulse rising edges, namely a first pulse rising edge and a second pulse rising edge in an original row synchronous signal pulse period, to increase the row signal refresh rate from the first value to the second value doubling the first value; and
continuously generate two pulse rising edges, namely a third pulse rising edge and a fourth pulse rising edge in an original field synchronous signal pulse period, to increase the field signal refresh rate from the third value to the fourth value doubling the third value.

The display driving unit 1303 is further configured to:
when the first pulse rising edge occurs, drive the liquid crystal molecule switching signal of the jth odd row on the display screen 1031 to be set as a high level, and keep the high level of the liquid crystal molecule switching signal till the liquid crystal molecule switching signal of the (j+1)th row is set as the high level, wherein j is an odd number larger than or equal to 1;
when the second pulse rising edge occurs, drive the liquid crystal molecule switching signal of the (j+1)th row on the display screen 1031 to be set as the high level;
wherein, when the liquid crystal molecule switching signals of the jth odd row and the (j+1)th row on the display screen 1031 are driven to be simultaneously at high levels, the corresponding row of data of the first recombinant image or the second recombinant image is transmitted to the jth odd row and the (j+1)th row of the display screen 1031 simultaneously for displaying;
when the third pulse rising edge occurs, drive and display the left eye image corresponding to the left eye image data included in the first recombinant image or the right eye image corresponding to the right eye image data included in the second recombinant image on the display screen 1031; and
when the fourth pulse rising edge occurs, drive and display the first compensation image corresponding to the first compensation image data included in the first recombinant image or the second compensation image corresponding to the second compensation image data included in the second recombinant image on the display screen 1031.

Fourth Embodiment

The embodiment provides an image display device, also as shown in FIG. 9. FIG. 9 is a frame diagram of the image display device in the third embodiment. The device includes:
- an image signal receiving unit 101, configured to receive a frame of 3D image, wherein the 3D image includes left eye image data and right eye image data;
- an image data calculating unit 102, connected with the image signal receiving unit 101 and configured to calculating on the basis of the left eye image data and the right eye image data to acquire first compensation image data and second compensation image data;
- a display unit 103, the display unit 103 capable of being connected with 3D glasses 20 and including a display screen 1031 and a control signal transmitting unit 1032, wherein the 3D glasses 20 include a left spectacle lens 201, a right spectacle lens 202 and a control signal receiving unit 203, wherein,
in a first image display period, a left eye image acquired on the basis of the left eye image data is displayed on the display screen 1031, and meanwhile a first control signal is transmitted to the 3D glasses 20 through the control signal transmitting unit 1032, wherein the 3D glasses 20 can receive the first control signal through the control signal receiving unit 203 and allow the left spectacle lens 201 to be in an open state and allow the right spectacle lens 202 to be in a closed state under the control of the first control signal;

in a second image display period, a first compensation image acquired on the basis of the first compensation image data is displayed on the display screen 1031, wherein in the second image display period, both the left spectacle lens 201 and the right spectacle lens 202 of the 3D glasses 20 are in the closed state;

in a third image display period, a right eye image acquired on the basis of the right eye image data is displayed on the display screen 1031, and meanwhile a second control signal is transmitted to the 3D glasses 20 through the control signal transmitting unit 1032, wherein the 3D glasses 20 can receive the second control signal through the control signal receiving unit 203 and allow the right spectacle lens 202 to be in an open state and allow the left spectacle lens 201 to be in a closed state under the control of the second control signal; and in a fourth image display period, a second compensation image acquired on the basis of the second compensation image data is displayed on the display screen 1031, wherein in the fourth image display period, both the left spectacle lens 201 and the right spectacle lens 202 of the 3D glasses 20 are in the closed state;

wherein, the superposed image of the left eye image, the first compensation image, the right eye image and the second compensation image is the left eye image or the right eye image.

The image signal receiving unit 101 and the image data calculating unit 102 in the fourth embodiment are the same as those in the third embodiment and not repeatedly explained here.

Further, as shown in FIG. 10, the display unit 103 includes:

a display image processing unit 1304, connected with the image data calculating unit 102 and configured to perform image data recombination on the left eye image data, the right eye image data, the first compensation image data and the second compensation image data to acquire a frame of recombinant image;

wherein, the frame of recombinant image includes the left eye image data, the right eye image data, the first compensation image data and the second compensation image data;

a display driving unit 1303, connected with the display image processing unit 1304 and configured to perform frequency doubling non-interlaced display on the recombinant image and display four frames of images on the display screen 1031;

in the first image display period, performing frequency doubling non-interlaced driving display on the left eye image included in the frame of recombinant image;

in the second image display period, performing frequency doubling non-interlaced driving display on the first compensation image included in the frame of recombinant image;

in the third image display period, performing frequency doubling non-interlaced driving display on the right eye image included in the frame of recombinant image;

in the fourth image display period, performing frequency doubling non-interlaced driving display on the second compensation image included in the frame of recombinant image;

a display screen 1031, connected with the display driving unit 1303, and in the first image display period, configured to display the left eye image on the display screen 1031;

in the second image display period, configured to display the first compensation image on the display screen 1031;

in the third image display period, configured to display the right eye image on the display screen 1031; and in the fourth image display period, configured to display the second compensation image on the display screen 1031.

In the embodiment, the display image processing unit 1304 can be completed by a system on chip SOC; the image data calculating unit 102 can also be completed by the SOC; and the SOC performs image data recombination on the left eye image data, the right eye image data, the first compensation image data and the second compensation image data, and processes the frame of 3D image to output a frame of recombinant image.

The display driving unit 1303 can be completed by a Motion Estimate and Motion Compensation chip MEMC IC which is connected with the SOC, the MEMC IC is used for completing frequency doubling non-interlaced display on the recombinant image, to display four frames of images on the display screen 1031.

The display screen 1031 can be a 240 Hz liquid crystal screen which is connected with the MEMC IC, and a frame of recombinant image is displayed as four frames of images on the 240 Hz liquid crystal screen.

Comparably, as shown in FIG. 10, the display unit 103 includes:

a display image processing unit 1304, connected with the image data calculating unit 102 and configured to acquire a first recombinant image in the recombinant image on the basis of the left eye image data and the first compensation image data and acquire a second recombinant image in the recombinant image on the basis of the right eye image data and the second compensation image data;

a display driving unit 1303, connected with the display image processing unit 1304 and configured to perform frequency doubling non-interlaced display on the first recombinant image and the second recombinant image and display four frames of images on the display screen 1031;

in the first image display period, perform frequency doubling non-interlaced driving display on the left eye image data included in the first recombinant image;

in the second image display period, perform frequency doubling non-interlaced driving display on the first compensation image data included in the first recombinant image;

in the third image display period, perform frequency doubling non-interlaced driving display on the right eye image data included in the second recombinant image;

in the fourth image display period, perform frequency doubling non-interlaced driving display on the second compensation image data included in the second recombinant image;

a display screen 1031, connected with the display driving unit 1303, and in the first image display period, configured to display the left eye image on the display screen 1031;

in the second image display period, configured to display the first compensation image on the display screen 1031;
in the third image display period, configured to display the right eye image on the display screen 1031; and
in the fourth image display period, configured to display the second compensation image on the display screen 1031.

In the embodiment, the display image processing unit 1304 can be completed by an image processing chip MstaR 7398R, recombines the left eye image data and the first compensation image data to acquire the first recombinant image, and recombines the right eye image data and the second compensation image data to acquire the second recombinant image.

The display driving unit 1303 can be completed by an MEMC IC connected with the image processing chip Mstar 7398r, performs frequency doubling non-interlaced display on the first recombinant image and the second recombinant image, and displays four frames of images on the display screen 1031.

The display screen 1031 can be a 240 Hz liquid crystal screen connected with the MEMC IC, and displays a frame of recombinant image as four frames of images on the 240 Hz liquid crystal screen.

Figure 11:
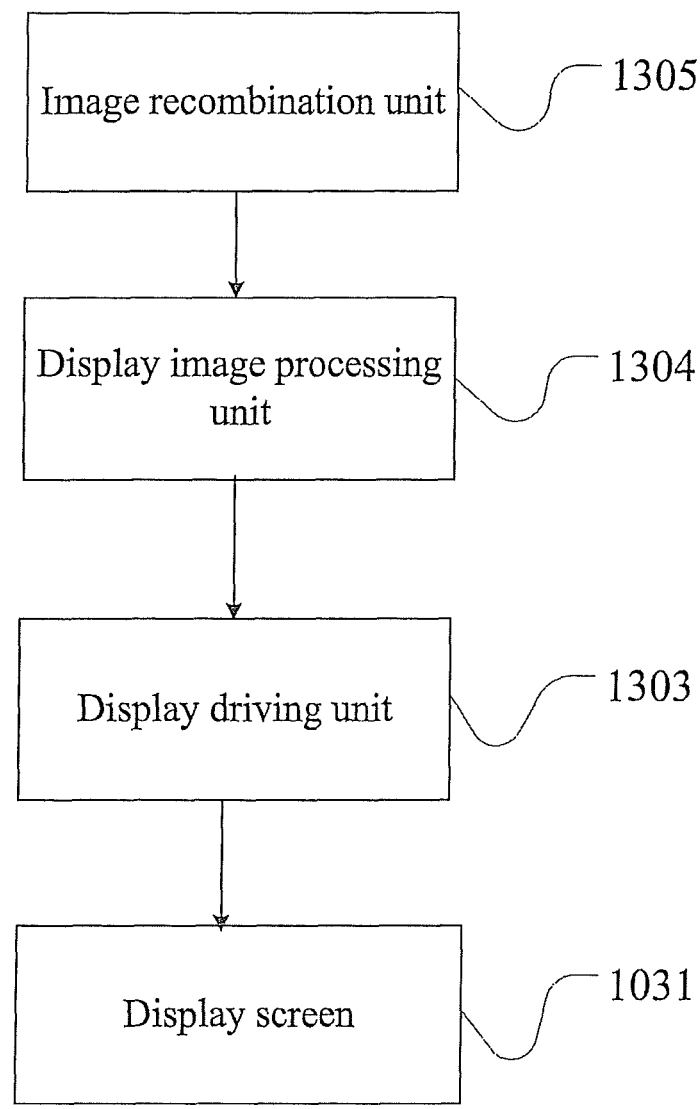
FIG. 11 is a frame diagram of the display unit in the device in a fourth embodiment of the application.

Comparably, as shown in FIG. 11, FIG. 11 is a frame diagram of the display unit in the device of the fourth embodiment. The display unit 103 includes:
an image recombination unit 1305, connected with the image data calculating unit 102, and configured to acquire a frame of recombinant image on the basis of the left eye image data, the first compensation image data, the right eye image data and the second compensation image data;
a display image processing unit 1304, connected with the image recombination unit 1305, and configured to acquire a first recombinant image on the basis of the left eye image data and the first compensation image data included in the frame of recombinant image corresponding to the 3D image and acquire a second recombinant image on the basis of the right eye image data and the second compensation image data included in the frame of recombinant image;
a display driving unit 1303 connected with the display image processing unit 1304 and configured to perform frequency doubling non-interlaced display on the first recombinant image and the second recombinant image and display four frames of images on the display screen 1031;
wherein, in the first image display period, perform frequency doubling non-interlaced driving display on the left eye image data included in the first recombinant image;
in the second image display period, perform frequency doubling non-interlaced driving display on the first compensation image data included in the first recombinant image;
in the third image display period, perform frequency doubling non-interlaced driving display on the right eye image data included in the second recombinant image;
in the fourth image display period, perform frequency doubling non-interlaced driving display on the second compensation image data included in the second recombinant image;
a display screen 1031, connected with the display driving unit 1303, and in the first image display period, configured to display the left eye image on the display screen 1031;
in the second image display period, configured to display the first compensation image on the display screen 1031;
in the third image display period, configured to display the right eye image on the display screen 1031; and
in the fourth image display period, configured to display the second compensation image on the display screen 1031.

In the embodiment, the image recombination unit 1305 can be completed by an embedded programmable gate array (EPGA) chip and is used for compressing the left eye image data, the right eye image data, the first compensation image data and the second compensation image data to acquire a frame of recombinant image.

The display image processing unit 1304 can be completed by an integrated image processing chip connected with the EPGA chip, acquires the first recombinant image on the basis of the left eye image data and the first compensation image data included in a frame of recombinant image, and acquires the second recombinant image on the basis of the right eye image data and the second compensation image data included in the frame of recombinant image.

The display screen 1031 can be a 240 Hz liquid crystal screen connected with the MEMC IC, and displays a frame of recombinant image as four frames of images on the 240 Hz liquid crystal screen.

Through the technical solutions of one or more embodiments of the invention, at least the following technical effects can be achieved.

Firstly, the first and second compensation images are added, and the superposed image of the left eye image, the right eye image, the first compensation image and the second compensation image is the left eye image or the right eye image, so that the fact that double-image is displayed on the display screen 1031 of the electronic equipment in the prior art is solved, and the technical effect of directly displaying the left eye image or the right eye image without double-image on the display screen 1031 is achieved.

Secondly, the left eye image or the right eye image without double-image can be directly displayed on the display screen 1031, so that the fact that 3D watchers and 2D watchers cannot watch clear images at the same time in the prior art can be effectively solved, and the technical effect that the 3D watchers and the 2D watchers can watch clear images at the same time is achieved.

Thirdly, for the same watcher, random switching of watching modes can be realized through the technical solutions of the embodiments, namely when the images are not expected to be watched in a 3D mode, the 3D glasses 20 can be taken off, and the left eye image or the right eye image without double-image is directly watched with eyes on the display screen 1031; and when the images are not expected to be watched in a 2D mode, the 3D glasses 20 can be worn, and the clear 3D images can be watched through the 3D glasses 20.

Although the preferable embodiments of the present invention have already been described, those skilled in the art can make other change and modifications for the embodiments once they acquire the basic inventive concept. So, the claims intend to be constructed as including the preferable embodiments and all changes and modifications falling in the scope of the present invention.

Obviously, those skilled in the art can change and modify the present application without departing from the sprit and the scope of the present invention. The present invention intends to encompass the modifications and change if the they fall in the scope of to the claims of the present invention and equivalent technologies thereof.

The invention claimed is:

1. An image display method, applied to electronic equipment comprising a display screen, wherein the method comprises:

acquiring a frame of 3D image, wherein the frame of 3D image comprises left eye image data and right eye image data;

acquiring first compensation image data and second compensation image data;

in a first image display period, displaying a left eye image acquired on the basis of the left eye image data on the display screen, and meanwhile transmitting a first control signal to 3D glasses matched with the electronic equipment and comprising a left spectacle lens and a right spectacle lens, wherein the 3D glasses can allow the left spectacle lens to be in an open state and allow the right spectacle lens to be in a closed state based on the first control signal;

in a second image display period, displaying a first compensation image acquired on the basis of the first compensation image data on the display screen, wherein in the second image display period, both the left spectacle lens and the right spectacle lens of the 3D glasses are in a closed state;

in a third image display period, displaying a right eye image acquired on the basis of the right eye image data on the display screen, and meanwhile transmitting a second control signal to the 3D glasses, wherein the 3D glasses can allow the right spectacle lens to be in an open state and allow the left spectacle lens to be in a closed state based on the second control signal; and in a fourth image display period, displaying a second compensation image acquired on the basis of the second compensation image data on the display screen, wherein in the fourth image display period, both the left spectacle lens and the right spectacle lens of the 3D glasses are in a closed state;

wherein, a superposed image of the left eye image, the first compensation image, the right eye image and the second compensation image is the left eye image or the right eye image;

wherein, displaying the left eye image acquired on the basis of the left eye image data on the display screen in the first image display period and displaying the first compensation image acquired on the basis of the first compensation image data on the display screen in the second image display period comprises:

acquiring a first recombinant image on the basis of the left eye image data and the first compensation image data;

increasing a row signal refresh rate from a first value to a second value doubling the first value, and increasing a field signal refresh rate from a third value to a fourth value doubling the third value; and displaying the first recombinant image on the display screen by using the second value as the row signal refresh rate and using the fourth value as the field signal refresh rate, wherein the left eye image corresponding to the left eye image data comprised in the first recombinant image is displayed on the display screen in the first image display period, and the first compensation image corresponding to the first compensation image data comprised in the first recombinant image is displayed on the display screen in the second image display period.

2. The method of claim 1, wherein acquiring the first compensation image data and the second compensation image data comprises:

acquiring the first compensation image data and the second compensation image data on the basis of the left eye image data and the right eye image data.

3. The method of claim 2, wherein acquiring the first compensation image data and the second compensation image data on the basis of the left eye image data and the right eye image data comprises:

processing the left eye image data and the right eye image data based on a formula $W+W'=(n-1)L-R$ or a formula $W+W'=(n-1)R-L$ to acquire the first compensation image data and the second compensation image data, wherein L is data of the ith pixel point in the left eye image data, R is data of the ith pixel point in the right eye image data, W is data of the ith pixel point in the first compensation image data, W' is data of the ith pixel point in the second compensation image data, n is a natural number larger than 2, and i is an integer larger than or equal to 1.

4. The method of claim 3, wherein, when n is equal to 4, processing the left eye image data and the right eye image data based on a formula $W+W'=(n-1)L-R$ or a formula $W+W'=(n-1)R-L$ to acquire the first compensation image data and the second compensation image data comprises:

processing the left eye image data and the right eye image data based on a formula $W+W'=3L-R$ or a formula $W+W'=3R-L$ to acquire the first compensation image data and the second compensation image data.

5. The method of claim 4, wherein, when W is the same as W', processing the left eye image data and the right eye image data based on a formula $W+W'=3L-R$ or a formula $W+W'=3R-L$ to acquire the first compensation image data and the second compensation image data comprises:

processing the left eye image data and the right eye image data based on a formula $W=W'=(3L-R)/2$ or a formula $W=W'=(3R-L)/2$ to acquire the first compensation image data and the second compensation image data, wherein the first compensation image data is the same as the second compensation image data.

6. The method of claim 1, wherein, acquiring the first recombinant image on the basis of the left eye image data and the first compensation image data comprises:

acquiring a first half field image of the first recombinant image on the basis of the left eye image data and acquiring a second half field image of the first recombinant image on the basis of the first compensation image data; and acquiring the first recombinant image on the basis of the first half field image and the second half field image.

7. The method of claim 1, wherein, displaying the right eye image acquired on the basis of the right eye image data on the display screen in the third image display period and displaying the second compensation image acquired on the basis of the second compensation image data on the display screen in the fourth image display period comprise:

acquiring a second recombinant image on the basis of the right eye image data and the second compensation image data;

increasing a row signal refresh rate from the first value to the second value doubling the first value, and increasing a field signal refresh rate from the third value to the fourth value doubling the third value; and displaying the second recombinant image on the display screen by using the second value as the row signal refresh rate and using the fourth value as the field signal refresh rate, wherein the right eye image corresponding to the right eye image data comprised in the second recombinant image is displayed on the display screen in the third image display period, and the second compensation image corresponding to the second compensation image data comprised in the second recombinant image is displayed on the display screen in the fourth image display period.

8. The method of claim 7, wherein acquiring the second recombinant image on the basis of the right eye image data and the second compensation image data comprises:
   acquiring a first half field image of the second recombinant image on the basis of the right eye image data and acquiring a second half field image of the second recombinant image on the basis of the second compensation image data; and
   acquiring the second recombinant image on the basis of the first half field image and the second half field image.

9. The method of claim 1, wherein increasing the row signal refresh rate from the first value to the second value doubling the first value comprises:
   continuously generating two pulse rising edges, namely a first pulse rising edge and a second pulse rising edge, in an original row synchronous signal pulse period, to increase the row signal refresh rate from the first value to the second value doubling the first value;
   increasing the field signal refresh rate from the third value to the fourth value doubling the third value comprises:
   continuously generating two pulse rising edges, namely a third pulse rising edge and a fourth pulse rising edge, in an original field synchronous signal pulse period, to increase the field signal refresh rate from the third value to the fourth value doubling the third value.

10. The method of claim 9, wherein displaying the first recombinant image or the second recombinant image on the display screen by using the second value as the row signal refresh rate and using the fourth value as the field signal refresh rate comprises:
   when the first pulse rising edge occurs, setting a liquid crystal molecule switching signal of the jth odd row on the display screen as a high level, and keeping the high level of the liquid crystal molecule switching signal till a liquid crystal molecule switching signal of the (j+1)th row is set as the high level, wherein j is an odd larger than or equal to 1;
   when the second pulse rising edge occurs, setting the liquid crystal molecule switching signal of the (j+1)th row on the display screen as the high level;
   wherein, when the liquid crystal molecule switching signals of the jth odd row and the (j+1)th row on the display screen are simultaneously at high levels, a corresponding row of data of the first recombinant image or the second recombinant image is transmitted to the jth odd row and the (j+1)th row on the display screen simultaneously for displaying;
   when the third pulse rising edge occurs, displaying the left eye image corresponding to the left eye image data comprised in the first recombinant image or the right eye image corresponding to the right eye image data comprised in the second recombinant image on the display screen; and
   when the fourth pulse rising edge occurs, displaying the first compensation image corresponding to the first compensation image data comprised in the first recombinant image or the second compensation image corresponding to the second compensation image data comprised in the second recombinant image on the display screen.

11. An image display method, applied to electronic equipment comprising a display screen, wherein the method comprises:
   acquiring a frame of 3D image, wherein the frame of 3D image comprises left eye image data and right eye image date;
   acquiring first compensation image data and second compensation image data;
   in a first image display period, displaying a left eye image acquired on the basis of the left eye image data on the display screen, and meanwhile transmitting a first control signal to 3D glasses matched with electronic equipment and comprising a left spectacle lens and a right spectacle lens, wherein the 3D glasses can allow the left spectacle lens to be in an open state and allow the right spectacle lens to be in a closed state based on the first control signal;
   in a second image display period, displaying a first compensation image acquired on the basis of the first compensation image data on the display screen, wherein in the second image display period, both the left spectacle lens and the right spectacle lens of the 3D glasses are in a closed state;
   in a third image display period, displaying a right eye image acquired on the basis of the right eye image data on the display screen, and meanwhile transmitting a second control signal to the 3D glasses, wherein the 3D glasses can allow the right spectacle lens to be in an open state and allow the left spectacle lens to be in a closed state based on the second control signal; and
   in a fourth image display period, displaying a second compensation image acquired on the basis of the second compensation image data on the display screen, wherein the fourth image display period, both the left spectacle lens and the right spectacle lens of the 3D glasses are in a closed state;
   wherein, a superposed image of the left eye image, the first compensation image, the right eye image and the second compensation image is the left eye image or the right eye image;
      wherein, before the left eye image acquired on the basis of the left eye image data is displayed on the display screen in the first image display period, the method further comprises:
   performing image data recombination on the left eye image data, the right eye image data, the first compensation image data and the second compensation image data to acquire recombinant images.

12. The method of claim 11, wherein performing image data recombination on the left eye image data, the right eye image data, the first compensation image data and the second compensation image data to acquire the recombinant images comprises:
   performing data compression on the left eye image data, the right eye image data, the first compensation image data and the second compensation image data to acquire a frame of recombinant images;
   wherein, the frame of recombinant images comprises the left eye image data, the right eye image data, the first compensation image data and the second compensation image data.

13. The method of claim 11, wherein performing image data recombination on the left eye image data, the right eye image data, the first compensation image data and the second compensation image data to acquire the recombinant images comprises:
   acquiring a first recombinant image in the recombinant images on the basis of the left eye image data and the first compensation image data; and acquiring a second recombinant image in the recombinant images on the basis of the right eye image data and the second compensation image data.

14. The method of claim 11, wherein performing image data recombination on the left eye image data, the right eye image data, the first compensation image data and the second compensation image data to acquire the recombinant images comprises:
    acquiring a frame of recombinant images on the basis of the left eye image data, the first compensation image data, the right eye image data and the second compensation image data;
    acquiring a first recombinant image on the basis of the left eye image data and the first compensation image data comprised in the frame of recombinant images; and
    acquiring a second recombinant image on the basis of the right eye image data and the second compensation image data comprised in the frame of recombinant images.

15. An image display method, applied to electronic equipment comprising a display screen, wherein the method comprises:
    acquiring a frame of 3D image, wherein the frame of 3D image comprises left eye image data and right eye image date;
    acquiring first compensation image data and second compensation image data;
    in a first image display period, displaying a left eye image acquired on the basis of the left eye image data on the display screen, and meanwhile transmitting a first control signal to 3D glasses matched with electronic equipment and comprising a left spectacle lens and a right spectacle lens, wherein the 3D glasses can allow the left spectacle lens to be in an open state and allow the right spectacle lens to be in a closed state based on the first control signal;
    in a second image display period, displaying a first compensation image acquired on the basis of the first compensation image data on the display screen, wherein in the second image display period, both the left spectacle lens and the right spectacle lens of the 3D glasses are in a closed state;
    in a third image display period, displaying a right eye image acquired on the basis of the right eye image data on the display screen, and meanwhile transmitting a second control signal to the 3D glasses, wherein the 3D glasses can allow the right spectacle lens to be in an open state and allow the left spectacle lens to be in a closed state based on the second control signal; and
    in a fourth image display period, displaying a second compensation image acquired on the basis of the second compensation image data on the display screen, wherein the fourth image display period, both the left spectacle lens and the right spectacle lens of the 3D glasses are in a closed state;
    wherein, a superposed image of the left eye image, the first compensation image, the right eye image and the second compensation image is the left eye image or the right eye image;
        wherein, after acquiring the first compensation image data and the second compensation image data, the method further comprises:
    recombining the left eye image data, the right eye image data, the first compensation image data and the second compensation image data to acquire four fields of image data.

16. The method of claim 15, wherein,
    displaying the left eye image acquired on the basis of the left eye image data on the display screen in the first image display period comprises:
    displaying the left eye image acquired on the basis of the first field of the left eye image data on the display screen in the first image display period;
    displaying the first compensation image acquired on the basis of the first compensation image data on the display screen in the second image display period comprises:
    displaying the first compensation image acquired on the basis of the second field of the first compensation image data on the display screen in the second image display period;
    displaying the right eye image acquired on the basis of the right eye image data on the display screen in the third image display period comprises:
    displaying the right eye image acquired on the basis of the third field of the right eye image data on the display screen in the third image display period; and
    displaying the second compensation image acquired on the basis of the second compensation image data on the display screen in the fourth image display period comprises:
    displaying the second compensation image acquired on the basis of the fourth field of the second compensation image data on the display screen in the fourth image display period.

* * * * *